(12) United States Patent
Chen et al.

(10) Patent No.: US 9,491,461 B2
(45) Date of Patent: Nov. 8, 2016

(54) SCALABLE EXTENSIONS TO HEVC AND TEMPORAL MOTION VECTOR PREDICTION

(71) Applicant: QUALCOMM Incorporated, San Diego, CA (US)

(72) Inventors: Ying Chen, San Diego, CA (US); Vadim Seregin, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 14/037,738

(22) Filed: Sep. 26, 2013

(65) Prior Publication Data

US 2014/0086325 A1    Mar. 27, 2014

Related U.S. Application Data

(60) Provisional application No. 61/706,669, filed on Sep. 27, 2012, provisional application No. 61/708,010, filed on Sep. 30, 2012.

(51) Int. Cl.
| | |
|---|---|
| *H04N 7/12* | (2006.01) |
| *H04N 19/51* | (2014.01) |
| *H04N 19/52* | (2014.01) |
| *H04N 19/30* | (2014.01) |

(Continued)

(52) U.S. Cl.
CPC ........ *H04N 19/00703* (2013.01); *H04N 19/30* (2014.11); *H04N 19/31* (2014.11); *H04N 19/52* (2014.11); *H04N 19/521* (2014.11); *H04N 19/58* (2014.11); *H04N 19/61* (2014.11)

(58) Field of Classification Search
CPC .......... H04N 19/00703; H04N 19/30; H04N 19/31; H04N 19/52; H04N 19/521; H04N 19/58; H04N 19/61
USPC ..................................... 375/240.14
See application file for complete search history.

(56) References Cited

U.S. PATENT DOCUMENTS

| 8,311,111 B2 * | 11/2012 | Xu ........................ H04N 19/51 |
| | | 375/240.08 |
| 9,325,990 B2 * | 4/2016 | Chen .................... H04N 19/105 |

(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Shan Elahi
(74) *Attorney, Agent, or Firm* — Shumaker & Sieffert, P.A.

(57) ABSTRACT

In one example, a device includes a video coder configured to determine a first co-located reference picture for generating a first temporal motion vector predictor candidate for predicting a motion vector of a current block, determine a second co-located reference picture for generating a second temporal motion vector predictor candidate for predicting the motion vector of the current block, determine a motion vector predictor candidate list that includes at least one of the first temporal motion vector predictor candidate and the second temporal motion vector predictor candidate, select a motion vector predictor from the motion vector predictor candidate list, and code the motion vector of the current block relative to the selected motion vector predictor.

33 Claims, 10 Drawing Sheets

(51) Int. Cl.
  *H04N 19/61* (2014.01)
  *H04N 19/31* (2014.01)
  *H04N 19/58* (2014.01)
  *H04N 19/513* (2014.01)

(56) References Cited

U.S. PATENT DOCUMENTS

| | | | |
|---|---|---|---|
| 2008/0107180 A1* | 5/2008 | Lee | H04N 19/52 375/240.16 |
| 2008/0111722 A1* | 5/2008 | Reznik | H03M 7/40 341/67 |
| 2010/0098155 A1* | 4/2010 | Demircin | H03M 7/4006 375/240.02 |
| 2011/0255594 A1* | 10/2011 | Nagori | H04N 19/196 375/240.03 |
| 2011/0293001 A1* | 12/2011 | Lim | G06K 9/36 375/240.12 |
| 2012/0008688 A1* | 1/2012 | Tsai et al. | 375/240.16 |
| 2012/0057631 A1* | 3/2012 | Le Leannec | H04N 19/56 375/240.16 |
| 2012/0106622 A1* | 5/2012 | Huang | H04N 19/129 375/240.01 |
| 2012/0128060 A1 | 5/2012 | Lin et al. | |
| 2012/0195379 A1* | 8/2012 | Alshin | H04N 19/105 375/240.12 |
| 2012/0201295 A1* | 8/2012 | Kim | H04N 19/70 375/240.03 |
| 2012/0236942 A1 | 9/2012 | Lin et al. | |
| 2012/0257678 A1* | 10/2012 | Zhou | H04N 19/436 375/240.16 |
| 2012/0287999 A1* | 11/2012 | Li | H04N 19/52 375/240.16 |
| 2013/0003851 A1* | 1/2013 | Yu | H04N 19/105 375/240.16 |
| 2013/0107965 A1* | 5/2013 | Wahadaniah et al. | 375/240.16 |
| 2013/0188718 A1 | 7/2013 | Chen et al. | |
| 2013/0194384 A1 | 8/2013 | Hannuksela | |
| 2013/0195188 A1 | 8/2013 | Sugio et al. | |
| 2013/0208792 A1* | 8/2013 | He | H04N 19/00569 375/240.12 |
| 2013/0287108 A1* | 10/2013 | Chen | H04N 19/597 375/240.16 |
| 2014/0016701 A1* | 1/2014 | Chen | H04N 19/105 375/240.14 |
| 2014/0092978 A1* | 4/2014 | Bugdayci | H04N 19/513 375/240.16 |
| 2014/0126641 A1* | 5/2014 | Takahashi | H04N 19/00769 375/240.16 |
| 2015/0110172 A1* | 4/2015 | Ye | H04N 19/33 375/240.02 |
| 2015/0195525 A1* | 7/2015 | Sullivan | H04N 19/139 375/240.02 |
| 2015/0195526 A1* | 7/2015 | Zhu | H04N 19/105 375/240.14 |
| 2015/0208084 A1* | 7/2015 | Zhu | H04N 19/105 375/240.02 |
| 2015/0281728 A1* | 10/2015 | Karczewicz | H04N 19/93 375/240.16 |
| 2015/0288965 A1* | 10/2015 | Li | H04N 19/124 375/240.03 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen, et al., "AHG10: Motion related hooks for HEVC multiview/3DV extension based on long-term reference pictures", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16 ), No. JCTVC-J0121, XP030112483, 8 pp.
Chen, et al., "Temporal motion vector prediction hook for efficient merge mode in MV-HEVC", JCT-VC Meeting; 103.MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.1tu.int/av-arch/.jctvc-site/, Document No. JCTVC-L0257, XP030113745, 12 pp.
Chen, et al., "Temporal motion vector prediction hook for efficient merge mode in MV-HEVC", JCT-3V Meeting; 103.MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16); URL:http://phenix.int-evry.fr/jct2/, Document No. JCT3V-C0064, XP030130480, 12 pp.
Chen, et al., "Temporal motion vector prediction hook for MV-HEVC", JCT-VC Meeting; MPEG Meeting; Oct. 10, 2012-Oct. 19, 2012; Shanghai; (Joint Collaborative Team on Video Coding of ISO/IEC JTC1/SC29/WG1•1 and ITU-T SG.16); URL: http://wftp3.itu.int/ av-arch/jctvc-site/,, No. JCTVC-K0239, XP030113121, 8 pp.
Chen, et al., "Temporal motion vector prediction hook for MV-HEVC (Information)", JCT-3V Meeting; MPEG Meeting; Oct. 13, 2012-Oct. 19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/, No. JCT3V-B0049, 8 pp.
Han Tan, et al., "Non-RCE2: Unified lossless residue coding" Joint Collaborative Team on Video Coding (JCT-VC) of ITU-T SG 16 WP 3 and ISO/IEC JTC 1/SC 29/WG 11 14th Meeting: Vienna, AT, Document: JCTVC-N100, Jul. 25-Aug. 2, 2013, 2 pp.
International Search Report and Written Opinion from International Application No. PCT/US2013/062358, dated Feb. 6, 2014, 16 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pages.
Lainema, et al., "Intra Coding of the HEVC Standard" IEEE Transactions on Circuits and Systems for Video Technology, vol. 22, No. 12, Dec. 2012, pp. 1792-1801.
Laroche, et al., "RD Optimized Coding for Motion Vector Predictor Selection",IEEE Transaction on Circuits and Systems for Video Technology, IEEE Service Center, Piscataway, NJ, US, vol. 18 (9), Sep. 1, 2008, XP011231739, ISSN: 1051-8215, pp. 1247-1257.
Li, et al., "Direct Mode Coding for Bipredictive Slices in the H.264 Standard", IEEE Transactions on Circuits and Systems for Video Technology, IEEE Service Center, Piscataway, NJ, US, vol. 15, No. 1, Jan. 1, 2005, XP011124673, pp. 119-126.
Naccari, et al., "RCE2: Experimental results for Test C.1" Joint Collaborative Team on Video Coding (JCT-VC) of ITU-T SG 16 WP 3 and ISO/IEC JTC 1/SC 29/WG 11 14th Meeting: Vienna, AT, Document: JCTVC-N0074, Jul. 25-Aug. 2, 2013, 6 pp.
Schwarz, et al., "Description of 3D Video Coding Technology Proposal by Fraunhofer HHI (HEVC compatible; configuration A)", MPEG Meeting; Nov. 28, 2011-Dec. 2, 2011; Geneva; (Motion Picture Expert Group or ISO/IEC JTC1/SC29/WG11), No. m22570, XP030051133, 46 pp.

(56) References Cited

OTHER PUBLICATIONS

Schwarz, et al., "Description of 3D Video Technology Proposal by Fraunhofer HHI (HEVC compatible, configuration B)", MPEG Meeting; Nov. 28, 2011-Dec. 2, 2011; Geneva; (Motion Picture Expert Group or ISO/IEC JTC1/SC29/WG11), No. m22571, XP030051134; 46 pp.

Schwarz, et al., "Test Model under Consideration for HEVC based 3D video coding," ISO/IEC JTC1/SC29/WG11 MPEG2011/N12559, Feb. 2012, San Jose, CA, USA, 44 pp.

Silcock, et al., "AHG12: Extension of HM7 to Support Additional Chroma Formats", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); XP030112553, 16 pp.

Sjoberg, et al., "Absolute signaling of reference pictures," Joint Collaborative Team on Video Coding (JCT-VC) of ITU-T SG16 WP3 and ISO/IEC JTC1/SC29/WG11 6th Meeting: Torino, Jul. 2011, Document: JCTVC-F493, 15 pp.

Tech, et al., "MV-HEVC Working Draft 1," Joint Collaborative Team on 3D Video Coding Extension Development of ITU-T SG 16 WP 3 and ISO/IEC JTC 1/SC 29/WG 11 1st Meeting: Stockholm, SE, Jul. 16-20, 2012, Document JCT3V-A1004_d0, 20 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Response to Written Opinion dated Feb. 6, 2014, from International Application No. PCT/US2013/062358, filed on Jul. 22, 2014, 35 pp.

Second Written Opinion from International Application No. PCT/US2013/062358, dated on Aug. 21, 2014, 10 pp.

Response to Second Written Opinion dated Aug. 21, 2014, from International Application No. PCT/US2013/062358, filed on Oct. 20, 2014, 12 pp.

International Preliminary Report on Patentability from International Application No. PCT/US2013/062358, dated Nov. 13, 2014, 41 pp.

\* cited by examiner

SCALABLE EXTENSIONS TO HEVC AND TEMPORAL MOTION VECTOR PREDICTION

This application claims the benefit of U.S. Provisional Patent Application No. 61/706,669, filed on Sep. 27, 2012, and U.S. Provisional Patent Application No. 61/708,010, filed on Sep. 30, 2012, the entire contents of both of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, such as Scalable Video Coding (SVC) and Multiview Video Coding (MVC). Version 8 of the Working Draft (WD) of HEVC is available from http://phenix.int-evry.fr/jct/doc_end_user/documents/10_Stockholm/wg11/JCTVC-J1003-v8.zip. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The techniques of this disclosure relate to coding motion vectors in video coding, including determining one or more temporal motion vector predictors (TMVPs). For example, the techniques of this disclosure include support for inter-view and/or inter-layer motion prediction in a scalable or multiview codec based on HEVC. According to aspects of this disclosure, a video coding device may determine more than one TMVP candidate for predicting a motion vector currently being coded from more than one picture. For example, according to aspects of this disclosure, the video coding device may determine a first TMVP candidate from a temporal reference picture in the same view or layer as the picture currently being coded, as well as a second TMVP candidate from an inter-view or inter-layer reference picture. Determining more than one TMVP when performing multiview or multilayer video coding may improve coding efficiency by potentially exploiting both temporal and inter-view/inter-layer motion information redundancies.

In one example, a method of decoding video data includes determining a first co-located reference picture for generating a first temporal motion vector predictor candidate for predicting a motion vector of a current block, determining a second co-located reference picture for generating a second temporal motion vector predictor candidate for predicting the motion vector of the current block, determining a motion vector predictor candidate list that includes at least one of the first temporal motion vector predictor candidate and the second temporal motion vector predictor candidate, selecting a motion vector predictor from the motion vector predictor candidate list, and decoding the motion vector of the current block relative to the selected motion vector predictor.

In another example, a method for encoding video data includes determining a first co-located reference picture for generating a first temporal motion vector predictor candidate for predicting a motion vector of a current block, determining a second co-located reference picture for generating a second temporal motion vector predictor candidate for predicting the motion vector of the current block, determining a motion vector predictor candidate list that includes at least one of the first temporal motion vector predictor candidate and the second temporal motion vector predictor candidate, selecting a motion vector predictor from the motion vector predictor candidate list, and encoding the motion vector of the current block relative to the selected motion vector predictor.

In another example, a device for coding video data includes a video coder configured to determine a first co-located reference picture for generating a first temporal motion vector predictor candidate for predicting a motion vector of a current block, determine a second co-located reference picture for generating a second temporal motion vector predictor candidate for predicting the motion vector of the current block, determine a motion vector predictor candidate list that includes at least one of the first temporal motion vector predictor candidate and the second temporal motion vector predictor candidate, select a motion vector predictor from the motion vector predictor candidate list, and code the motion vector of the current block relative to the selected motion vector predictor.

In another example, a device for coding video data includes means for determining a first co-located reference picture for generating a first temporal motion vector predictor candidate for predicting a motion vector of a current block, means for determining a second co-located reference picture for generating a second temporal motion vector predictor candidate for predicting the motion vector of the current block, means for determining a motion vector predictor candidate list that includes at least one of the first temporal motion vector predictor candidate and the second temporal motion vector predictor candidate, means for selecting a motion vector predictor from the motion vector predictor candidate list, and means for coding the motion vector of the current block relative to the selected motion vector predictor.

In another example, a computer-readable storage medium having stored thereon instructions that, when executed, cause a processor of a device for coding video data to determine a first co-located reference picture for generating a first temporal motion vector predictor candidate for predicting a motion vector of a current block, determine a second co-located reference picture for generating a second temporal motion vector predictor candidate for predicting the motion vector of the current block, determine a motion vector predictor candidate list that includes at least one of the first temporal motion vector predictor candidate and the second temporal motion vector predictor candidate, select a motion vector predictor from the motion vector predictor candidate list, and code the motion vector of the current block relative to the selected motion vector predictor.

The details of one or more examples are set forth in the accompanying drawings and the description below. Other features, objects, and advantages will be apparent from the description and drawings, and from the claims.

DETAILED DESCRIPTION

Figure 1:
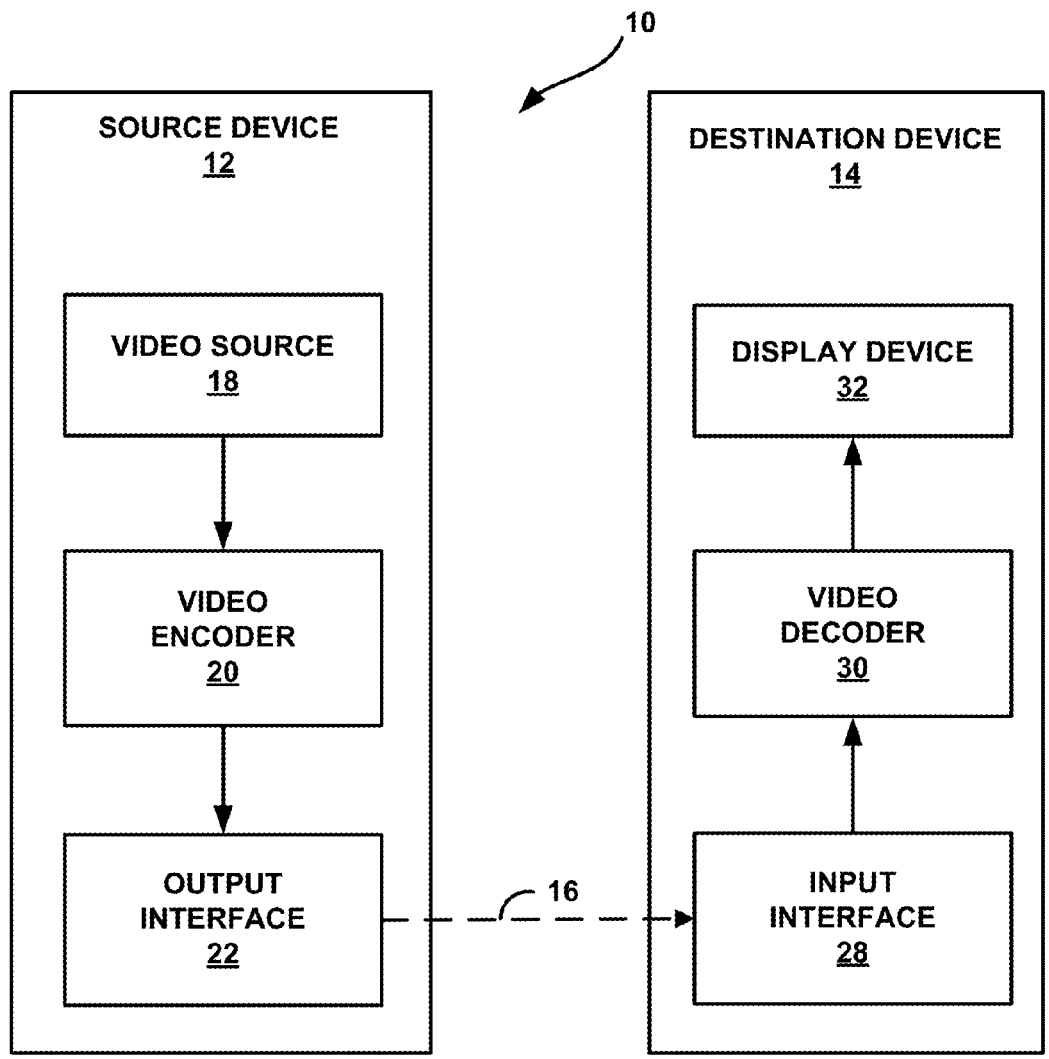
FIG. 1 is a block diagram illustrating an example video encoding and decoding system that may utilize techniques for determining a temporal motion vector predictor (TMVP).

Currently, the Motion Pictures Experts Group (MPEG) is developing a three-dimensional video (3DV) standard based on the High Efficiency Video Coding (HEVC) standard. Part of the standardization efforts also includes the standardization of a multiview video codec based on HEVC. For example, one standardization effort includes development of a multiview extension of HEVC, referred to as MV-HEVC, and another effort includes development of a depth-enhanced HEVC-based full 3DV codec, referred to as 3D-HEVC.

The Motion Pictures Experts Group (MPEG) is also developing a scalable video codec based on HEVC, referred to herein as HSVC (high efficiency scalable video coding). In some instances, a scalable video codec based on HEVC may also be referred to as SHVC (scalable high efficiency video coding). In any case, with respect to scalable video coding, view scalability and/or spatial scalability may also contribute to three dimensional video services, as such scalabilities allow for backward-compatible extensions for more views, and/or enhancing the resolution of views in a way that allows decoding by legacy devices.

In two-dimensional video coding, video data (that is, a sequence of pictures) is coded picture by picture, not necessarily in display order. Video coding devices divide each picture into blocks, and code each block individually. Block-based prediction modes include spatial prediction, also referred to as intra-prediction, and temporal prediction, also referred to as inter-prediction.

For three-dimensional video data, such as multiview or scalable coded data, blocks may also be inter-view and/or inter-layer predicted. As described herein, a video "layer" may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data.

Thus, this disclosure may interchangeably refer to a layer and a view of video data. That is, a view of video data may be referred to as a layer of video data, and vice versa. Moreover, the terms inter-view prediction and inter-layer prediction may interchangeably refer to prediction between multiple layers and/or views of video data. In addition, multi-layer codec (or multi-layer video coder) may jointly refer to a multiview codec or a scalable codec.

In some instances, blocks may be predicted from a picture of another view or layer of video data. In this manner, inter-view prediction based on reconstructed view components from different views may be enabled. This disclosure uses the term "view component" to refer to an encoded picture of a particular view or layer. That is, a view component may comprise an encoded picture for a particular view at a particular time (in terms of display order, or output order). A view component (or slices of a view component) may have a picture order count (POC) value, which generally indicates the display order (or output order) of the view component.

In temporal inter-prediction or inter-view prediction, a video coding device may code data indicative of one or more temporal motion vectors (temporal inter-prediction) and/or one or more disparity motion vectors (inter-view prediction). In some examples, a block coded with one temporal or disparity motion vector is referred to as a P-block, whereas a block coded with two motion vectors or two displacement vectors is referred to as a bi-predictive block, or B-block. Techniques that are applicable to motion vectors are also generally applicable to displacement vectors, and therefore, this disclosure primarily describes motion vector coding techniques. However, it should be understood that such techniques are also applicable to disparity motion vectors, and likewise, that techniques described with respect to disparity motion vectors are also applicable to temporal motion vectors, unless otherwise indicated.

Generally, data indicative of reference pictures, to which a motion vector or displacement vector may refer, are stored in reference picture lists. Thus, motion vector data (temporal or disparity motion vector data) may include not only data for an x-component and a y-component of the motion vector, but also an indication of an entry of the reference picture list, referred to as a reference picture index. Video coding devices may construct multiple reference picture lists. For example, a video coding device may construct a first reference picture list (list 0 or RefPicList0) to store data for reference pictures having POC values earlier than a current picture, and a second reference picture list (list 1 or RefPicList1) to store data for reference pictures having POC values later than a current picture. Again, it is noted that display or output orders for pictures are not necessarily the same as coding order values (e.g., frame number or "frame_num" values). Thus, pictures may be coded in an order that differs from the order in which the frames are displayed (or captured).

Typically, a reference picture list construction for the first or the second reference picture list of a B picture includes two steps: reference picture list initialization and reference picture list reordering (modification). The reference picture list initialization is an explicit mechanism that puts the reference pictures in a decoded picture buffer (DPB) (also referred to as a reference picture memory, as described in greater detail below with respect to FIGS. 2 and 3) into a list based on the order of POC (Picture Order Count, aligned with display order of a picture) values.

A reference picture list reordering mechanism can modify the position of a picture that was put in the list during the reference picture list initialization to any new position, or put any reference picture in the reference picture memory in any position even the picture doesn't belong to the initialized list. Some pictures after the reference picture list reordering (modification) may be put in a further position in the list. However, if a position of a picture exceeds the number of active reference pictures of the list, the picture is not considered as an entry of the final reference picture list. The number of active reference pictures may be signaled in a slice header for each list. After reference picture lists are constructed (e.g., RefPicList0 and RefPicList1, if available), a reference index can be used to identify a picture in any reference picture list.

HEVC distinguishes long-term from short-term reference pictures. For example, long-term pictures may be stored in the DPB relatively longer than short-term reference pictures. Additionally, syntax elements may be used to indicate whether a reference picture is a long-term or a short-term reference picture.

In extensions to HEVC (such as HSVC or MV/3D-HEVC) the long-term and short-term markings may instead be used to differentiate temporal reference pictures i.e., of the same layer or view as a current picture being coded) from inter-layer or inter-view reference pictures (i.e., of a different layer or view as the current picture being coded). In one example, short-term reference pictures may correspond to temporal reference pictures, while long-term reference pictures may instead correspond to inter-view reference pictures. Thus, the use of long-term and short-term reference pictures may also provide an indication of whether a reference picture is a temporal reference picture or an inter-view or inter-layer reference picture. Likewise, a motion vector referring to a short-term reference picture may comprise a temporal motion vector, whereas a motion vector referring to a long-term reference picture may comprise a disparity motion vector. In other examples, short-term reference pictures may correspond to inter-view or inter-layer reference pictures, while long-term reference pictures may correspond to temporal reference pictures.

Motion vector data may include a horizontal component (or x-component) and a vertical component (or y-component). Thus, a motion vector may be defined as <x, y>. Rather than coding the x-component and y-component of a motion vector directly, video coding devices may code the delta values of motion vectors relative to so-called "motion vector predictors." Thus, a motion vector is defined by the motion vector predictor plus the delta values, which indicate a difference between the motion vector predictor and the motion vector being coded. Motion vector predictors may be selected from spatial neighbors for a current block, a co-located block of a temporally separate picture (e.g., a collocated block in a previously coded picture), or a corresponding block of a picture in another view at the same temporal instance, in various examples. Motion vector predictors of a temporally separate picture or a picture from a different view may be referred to as temporal motion vector predictors (TMVPs).

To determine a TMVP for a current block (e.g., a current prediction unit (PU) of a current coding unit (CU) in HEVC, as described in greater detail with respect to FIG. 1 below), a video coding device may first identify a co-located picture. In general, the term "co-located picture" refers to a picture including a particular co-located block. The co-located block may also be included in a "co-located partition," as indicated in WD8 of HEVC.

After a co-located reference picture list is identified, the video coding device may use collocated_ref_idx, signaled in the slice header, to identify the co-located picture in the reference picture list. A co-located PU is then identified by checking the co-located picture. Either the motion vector of the right-bottom PU of the CU containing the current PU, or the motion vector of the right-bottom PU within the center PUs of the CU containing this PU, may be treated as the TMVP for the current PU.

In HEVC, the picture parameter set (PPS) includes a flag enable_temporal_mvp_flag. When a particular picture with temporal_id equal to 0 refers to a PPS having enable_temporal_mvp_flag equal to 0, all the reference pictures in the DPB may be marked as "unused for temporal motion vector prediction," and no motion vector from pictures before that particular picture in decoding order would be used as a temporal motion vector predictor in decoding of the particular picture or a picture after the particular picture in decoding order.

When deriving a TMVP for a uni-directional inter-predicted block, the reference picture list corresponding to the direction of the motion vector for the block being coded is used for TMVP derivation. That is, if the motion vector for the current block points to a reference picture in list 0, the TMVP may be derived using a co-located block in list 0. If the motion vector for the current block points to a reference picture in list 1, the TMVP may be derived using a co-located block in list 1. If the current picture is a B slice, a collocated_from_l0_flag may be signaled in a slice header of a slice of the current picture to indicate whether the co-located picture is from RefPicList0 or RefPicList1.

With respect to extending motion vector prediction or other coding techniques to multiview and/or scalable video coding (such as MV-HEVC, 3D-HEVC, or HSVC), in some examples, coding unit level or lower level changes may be needed to perform certain implementations of HEVC. However, in other examples, multiview and/or scalable coding may be achieved with a high level syntax (HLS)-only extension. For example, multiview video coding, three-dimensional video coding (multiview plus depth), or scalable video coding extensions (such as extensions of H.264/AVC or HEVC) may be achieved using HLS changes to the base standard. In such extensions, rather than introducing new coding structures, certain existing coding structures may be redefined or used in a different way to achieve an HLS-only extension.

Accordingly, a "HLS-only" enhancement layer is an enhancement layer that is coded using only HLS changes, such that block level coding need not be redesigned and can be reused. That is, modifications of syntax elements under a slice header are typically not allowed for HLS-only enhancement layers. In addition, with respect to HEVC, for example, coding unit (CU)-level decoding process changes are typically not allowed for HLS-only enhancement layers. As an example, motion vector prediction of an HEVC extension specification should be the same as that in the HEVC base specification when coding using an HLS-only enhancement layer.

To enable functionalities such as efficient inter-view prediction, modifications in both the HEVC extension and base specifications may be needed. The base specification changes, which do not impact the typical decoding processes or coding efficiency of the base HEVC decoders, but target at enabling functionalities in the extension specification may be referred to as "hooks." In most cases, a "HLS-only" requirement has to be fulfilled with both hooks in the base specification and HLS changes in the extension specification. If the hooks in the base specifications are not defined well, certain desired functionality may not be enabled in the extension specification or may require the extension specification to provide considerable modifications.

U.S. patent application Ser. No. 13/937,130 filed Jul. 8, 2013 and assigned to Qualcomm Incorporated, incorporated herein by reference, proposed that when a TMVP candidate refers to an inter-view or inter-layer reference picture (e.g., a long-term reference picture) and the target reference index of the TMVP (e.g., the reference picture index of the TMVP target picture, which may typically be initially set to index 0 of the reference picture list) is a temporal reference picture (e.g., a short-term reference picture), the target reference index of the TMVP may be changed to correspond to an inter-view or inter-layer reference picture (e.g., a long-term reference picture). Similarly, when a TMVP candidate refers to a temporal reference picture (e.g., a short-term reference picture) and the target reference index of the TMVP (e.g., the reference picture index of the TMVP target picture, which may typically be initially set to index 0 of the reference picture list) is an inter-view or inter-layer reference picture (e.g., a long-term reference picture), the target reference index of the TMVP may be changed to correspond to a temporal reference picture (e.g., a short-term reference picture). Thus, in some examples, the techniques described in U.S. patent application Ser. No. 13/937,130 generally support inter-view and/or inter-layer motion prediction using an HLS-only scalable or multiview/3DV HEVC codec.

However, HEVC does not support both inter-layer/inter-view motion vector prediction and motion vector prediction from a temporal reference picture simultaneously for a slice. For example, HEVC allows a single TMVP to be determined either from a temporal reference picture in the same view/layer, or from an inter-view/inter-layer reference picture in a different view. In other words, HEVC does not support determining both a first TMVP from a temporal reference picture in the same view or layer as the picture currently being coded, as well as determining a second TMVP from an inter-view or layer reference picture as the picture currently being coded.

Techniques of this disclosure include support for inter-view and/or inter-layer prediction in a scalable or multiview codec based on HEVC, with minor or no coding unit or lower level changes. For example, techniques of this disclosure include support for determining more than one TMVP candidate for predicting a motion vector currently being coded from more than one picture. According to aspects of this disclosure, a video coder (such as a video encoder or video decoder) may determine a first TMVP candidate from a temporal reference picture in the same view or layer as the picture currently being coded. In addition, the video coder may determine a second TMVP candidate from an inter-view or inter-layer reference picture. Determining more than one TMVP when performing multiview or multilayer video coding may improve coding efficiency by potentially exploiting both temporal and inter-view/inter-layer redundancies. In some instances, the techniques may be implemented in conjunction with the techniques described in U.S. patent application Ser. No. 13/937,130, which relate to determining a TMVP associated with a different view or layer than the picture currently being coded.

In an example for purposes of illustration, according to aspects of this disclosure, a video coder (such as a video encoder or video decoder) may determine an additional co-located reference picture to derive a second TMVP candidate. The additional co-located reference picture may be signaled in the slice header. The additional co-located reference picture may be derived based on a reference index of the additional co-located picture in the reference picture list.

In some examples, the additional co-located reference picture may be the reference picture having the relatively lowest reference picture index (with a reference picture index of zero being the lowest reference picture index) in either RefPicList0 or RefPiclist1 and that has a different picture type (e.g., either a short-term reference picture or a long-term reference picture) than the reference picture for the TMVP candidate as currently determined in HEVC. For example, if the reference picture for a TMVP candidate determined according to RefPicListX[collocated_ref_idx], with X equal to collocated_from_l0_flag is a long-term reference picture, the additional co-located reference picture may be the reference picture having the relatively lowest reference picture index that is also a short-term reference picture, or vice versa. Determining the additional the reference picture index of the additional co-located picture in this way may help to ensure that one co-located picture for determining a TMVP is a reference picture in the same view or layer, and the other reference picture for determining the second TMVP is an inter-view or inter-layer reference picture (e.g., given that long-term reference pictures correspond to temporal reference pictures and short-term reference pictures correspond to inter-view or inter-layer reference pictures, as noted above).

According to some aspects of this disclosure, the co-located picture for determining a TMVP that is not located in the layer or view currently being coded may be implemented such that, when the video coder is configured to code in two-dimensions (2D), the video coder assumes that the co-located picture is marked as a long-term picture.

In some examples, the video coder may determine a second co-located picture (colPic2) based on the marking status of the first co-located picture as identified by the syntax element in the slice header of HEVC. For example, if the first co-located picture is a short-term reference picture, the video coder identifies the second co-located picture in the reference picture list as a picture that is marked as long-term reference picture. To determine the second co-located picture, based on the first co-located picture (colPic1), the video coder may use the following example process:

```
for (i=0; i<= num_ref_idx_l0_active_minus1;i++)
    if (isShortTerm (colPic2) is not equal to
    isShortTerm(RefPicList0[i])) {
        colPic1 is set to be RefPicList0[i].
        return
    }
for (i=0; i<= num_ref_idx_l1_active_minus1;i++)
    if (isShortTerm (colPic2) is not equal to
    isShortTerm(RefPicList1[i])) {
        colPic1 is set to be RefPicList1[i].
        return
    }
where isShotTerm (pic) returns 1 if the picture pic is marked as a
short-term reference picture and 0 if the picture pic is marked as a
long-term reference picture.
```

In instances in which the video coder determines multiple TMVP candidates, according to some aspects of this disclosure, the video coder may rank the TMVP candidates in a motion vector predictor candidate list based on a predetermined priority. For example, for two co-located reference pictures (and two corresponding TMVP candidates), the video coder may assign a higher priority to the co-located reference picture that corresponds to a long-term type picture (e.g., an inter-view or inter-layer reference picture) than the other TMVP candidate. In this example, the video coder may insert the higher priority TMVP candidate (e.g., the first TMVP candidate, which corresponds to the long-term reference picture) into a motion vector predictor candidate list (e.g., a merge mode or Advanced Motion Vector Prediction (AMVP) candidate list, as described in greater detail below) relatively earlier in the motion vector predictor candidate list than the lower priority TMVP candidate (e.g., the second TMVP candidate, which corresponds to the short-term reference picture).

In some examples, the video coder may add a first TMVP candidate to a motion vector predictor candidate list prior to a spatial candidate (a motion vector predictor candidate derived from a block that spatially neighbors the block currently being coded, as described in greater detail with respect to FIG. 8 below). In such examples, with respect to the example described above, the video coder may add the first, higher priority TMVP candidate to a motion vector predictor candidate list prior to, i.e., closer to the beginning of the list, a spatial motion vector predictor candidate. In other examples, the video coder may add the first TMVP candidate to any other position of a motion vector predictor candidate list.

In some examples, the video coder may add a second TMVP candidate to a motion vector predictor candidate list in a manner similar to that performed in HEVC. In such examples, with respect to the example described above, the video coder may add the second, lower priority TMVP candidate to a motion vector predictor candidate list according to the position dictated by the HEVC standard (as described in greater detail, for example, with respect to FIG. 8). In other examples, the video coder may add the second TMVP candidate to any other position of a motion vector predictor candidate list.

HEVC limits the number of motion vector predictor candidates that may be added to the motion vector predictor candidate list. According to aspects of this disclosure, when generating an additional TMVP candidate in the manner described above, the final number of motion vector predictor candidates for the motion vector predictor candidate list may be increased relative to the HEVC standard. For example, the final number of AMVP candidates may be increased to 3. As another example, the final number of merge candidates may be increased to 6.

According to some techniques, multiple TMVP candidates may be considered, but only one TMVP candidate may be added to a motion vector predictor candidate list. For example, rather than adding TMVPs from two co-located reference pictures to a motion vector predictor candidate list in the manner described above, a video coder may keep only one co-located reference picture and determine only one associated TMVP. In this example, the video coder may identify multiple co-located reference pictures, but only use the co-located reference picture that corresponds to an inter-view or inter-layer reference picture for purposes of determining a TMVP. As noted above, the inter-view or inter-layer reference picture may be marked as a long-term reference picture.

Other techniques of this disclosure relate to determining a co-located block of a co-located picture for determining a TMVP. For example, according to aspects of this disclosure and as described in greater detail, e.g., with respect to FIG. 8, if a co-located reference picture for determining a TMVP is a long-term reference picture (or an inter-view or inter-layer reference picture), a video coder may derive the corresponding TMVP from a location in the co-located picture that corresponds to a location other than an outer bottom-right block of a co-located block.

Other techniques of this disclosure relate to motion compression and temporal motion vector prediction. For example, according to aspects of this disclosure and as described in greater detail, e.g., with respect to FIG. 7, a video coder may selectively compress reference pictures based on whether a particular reference picture is a co-located reference picture for determining a TMVP.

FIG. 1 is a block diagram illustrating an example video encoding and decoding system 10 that may utilize techniques for determining one or more TMVPs. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for determining one or more TMVPs. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining one or more TMVPs may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 24) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

While the techniques of this disclosure are not limited to any particular coding standard, the techniques may be relevant to the HEVC standard. More specifically, video encoder 20 and video decoder 30 may be configured to code video data according to an extension of the HEVC standard, e.g., a multiview extension or three-dimensional video (3DV) extension, including a scalable video coding (SVC) extension.

In general, HEVC allows a video picture to be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video encoder 20 and video decoder 30 may be configured to perform one or more of the various techniques of this disclosure, alone or in any combination. For example, in accordance with certain techniques of this disclosure, video encoder 20 and video decoder 30 may be configured to perform various techniques related to multiview and/or scalable video coding, e.g., as extensions of H.264/AVC or HEVC, to determine one or more TMVPs. As noted above, multiview and/or scalable extensions may be achieved via an HLS-only extension (e.g., SHVC, MV-HEVC, 3D-HEVC, or the like). Accordingly, in at least some examples, video encoder 20 and/or video decoder may perform the techniques of this disclosure to determine one or more TMVPs in a scalable or multiview codec based on HEVC, with few or no coding unit or lower level syntax changes.

To code video data in accordance with MVC, 3DV, and/or SVC extensions, video encoder 20 and video decoder 30 may be configured to perform inter-layer or inter-view prediction. That is, video encoder 20 and video decoder 30 may be configured to predict blocks of a current picture in a current view using data of a previously coded picture of a previously coded view. Typically, the previously coded picture (i.e., the inter-view reference picture) and the current picture have the same picture order count (POC) value, such that the inter-view reference picture and the current picture occur in the same access unit, and likewise, have substantially the same output order (or display order).

HEVC distinguishes long-term reference pictures from short-term reference pictures. In the techniques of HEVC, long-term pictures are stored in a decoded picture buffer (DPB) (also referred to as a reference picture memory, as described in greater detail below with respect to FIGS. 2 and 3) relatively longer than short-term reference pictures. Additionally, syntax elements are used to indicate whether a reference picture is a long-term or a short-term reference picture.

In some examples, in MVC and 3DV, short-term reference pictures may instead correspond to temporal reference pictures (i.e., of the same layer or view as a current picture being coded) while long-term reference pictures may instead correspond to inter-view reference pictures (i.e., of a different layer or view as the current picture being coded). Thus, the use of long-term and short-term reference pictures may also provide an indication of whether a reference picture is a temporal reference picture or an inter-view reference picture. Likewise, a motion vector referring to a short-term reference picture may comprise a temporal motion vector, whereas a motion vector referring to a long-term reference picture may comprise a disparity motion vector.

Video encoder 20 and video decoder 30 may be configured to perform various modes of motion vector prediction. With respect to HEVC, video encoder 20 and video decoder 30 may perform motion vector prediction according to a merge mode or AMVP. In merge mode, a motion vector for a block currently being coded may be inherited from one of a number of motion vector predictors in a motion vector predictor candidate list, referred to as a merge candidate list. The motion vector predictors in the merge mode list include motion vectors from a number of spatially neighboring blocks, temporally neighboring blocks, or neighboring blocks in a different view or layer (in the case of multi-view or multilayer video coding). Video encoder 20 and video decoder 30 may be configured to code one or more syntax elements that indicate from which of the candidates to inherit motion parameters. The syntax elements may indicate, for example, a reference picture list from which to select a reference picture, a reference index indicative of the reference picture in the reference list, a horizontal motion vector component, and a vertical motion vector component.

With respect to AMVP, video encoder 20 may calculate a motion vector difference value between a current motion vector (being predicted) and a motion vector predictor in a motion vector predictor candidate list, referred to as an AMVP candidate list. Similar to merge mode, the motion vector predictors in the AMVP candidate list include motion vectors from a number of spatially neighboring blocks, temporally neighboring blocks, or neighboring blocks in a different view or layer (in the case of multi-view or multi-layer video coding). Video encoder 20 also encodes a motion vector difference value between the current motion vector and a selected AMVP candidate from the candidate list. Likewise, video decoder 30 may combine the motion vector difference values with the determined motion vector predictor to reconstruct the current motion vector (i.e., a motion vector for a current block of video data, e.g., a current PU). Thus, in AMVP, video encoder 20 and video decoder 30 may be configured to code an indication of a reference picture list from which to select a reference picture, a reference index indicative of a reference picture in the reference picture list, a motion vector difference value, and an AMVP index representative of the candidate from which to select a motion vector predictor.

As noted above, video encoder 20 and video decoder 30 may, in some instances, determine one or more motion vector predictors from a collocated block of a temporally separate picture (that is, a collocated block in a previously coded picture), or from a picture in a different view or layer. Such motion vector predictors may be referred to as TMVPs. To determine a TMVP for a current block (e.g., a current prediction unit (PU) of a current coding unit (CU) in HEVC), video encoder 20 and video decoder 30 may first identify a so-called co-located picture. If the current picture is a B slice, video encoder 20 may signal a collocated_from_l0_flag in a slice header of a slice of the current picture to indicate whether the co-located picture is from RefPicList0 or RefPicList1, which may be decoded by video decoder 30. After a reference picture list is identified, video decoder 30 may use a collocated_ref_idx syntax element, signaled in the slice header, to identify the co-located picture in the reference picture list. Video decoder 30 may then identify a co-located PU by checking the co-located picture. Either the motion vector of the right-bottom PU of the CU containing the current PU, or the motion vector of the right-bottom PU within the center PUs of the CU containing this PU, may typically be treated as the TMVP for the current PU.

While a TMVP may be determined from a picture in a different view or layer than the picture currently being coded, HEVC does not support both inter-layer/inter-view motion vector prediction and motion vector prediction from a temporal reference picture simultaneously for a slice. For example, as noted above, HEVC does not support determining both a first TMVP from a temporal reference picture in the same view or layer as the picture currently being coded, as well as determining a second TMVP from an inter-view or layer reference picture as the picture currently being coded.

According to aspects of this disclosure, video encoder 20 and/or video decoder 30 may determine a first co-located reference picture for generating a first temporal motion vector predictor candidate for predicting a motion vector of a current block. Video encoder 20 and/or video decoder 30 may also determine a second co-located reference picture for generating a second temporal motion vector predictor candidate for predicting the motion vector of the current block. Video encoder 20 and/or video decoder 30 may then determine a motion vector predictor candidate list that includes at least one of the first temporal motion vector predictor candidate and the second temporal motion vector predictor candidate, selecting a motion vector predictor from the motion vector predictor candidate list, and coding the motion vector of the current block relative to the selected motion vector predictor.

As noted above, in general, the term "co-located picture" refers to a picture including a particular co-located block (also referred to as a co-located partition). Thus, "co-located reference picture" may be used as notational short-hand to refer to a picture including a co-located block of a current block of a current picture (a block currently being coded), and not necessarily to refer to a picture that is temporally co-located with the current picture.

In addition, a temporal motion vector predictor (TMVP) generally refers to a motion vector predictor that is determined using a picture other than the current picture. In some instances, a co-located picture from which a TMVP is derived may be located in the same view or layer as the current picture. In other instances, a co-located picture from which a TMVP is derived may be located in a different view or layer as the current picture. In addition, as noted above, techniques that are applicable to motion vectors are also generally applicable to displacement vectors, and vice versa.

In some examples, according to aspects of this disclosure, video encoder 20 and/or video decoder 30 may determine the first reference picture for generating the first TMVP candidate as a temporal reference picture in the same view or layer as the picture currently being coded. In addition, video encoder 20 and/or video decoder 30 may determine the second reference picture for generating the second TMVP candidate as an inter-view or inter-layer reference picture.

Video encoder 20 may, in some instances, signal the second co-located picture for generating the second TMVP candidate in a slice header. Accordingly, in such instances, video decoder 30 may determine the second co-located picture for generating the second TMVP candidate based on a reference index of the additional co-located picture in the reference picture list.

In some examples, video encoder 20 and/or video decoder 30 may determine the second co-located reference picture based on the reference picture having the relatively lowest reference picture index (with a reference picture index of zero being the lowest reference picture index) in either RefPicList0 or RefPiclist1. Additionally or alternatively, video encoder 20 and/or video decoder 30 may determine the second co-located reference picture based on a picture in a reference picture list that has a different picture type (e.g., either a short-term reference picture or a long-term reference picture) than the reference picture type of the first co-located reference picture.

In some instances, video encoder 20 and/or video decoder 30 may determine the first co-located reference picture according to the process of HEVC. For example, video encoder 20 and/or video decoder 30 may determine the first co-located reference picture corresponding to RefPicListX [collocated_ref_idx], with X equal to collocated_from_l0_flag, which may be a long-term reference picture or a short term reference picture. Video encoder 20 and/or video decoder 30 may then determine the second co-located reference picture based on the reference picture in the same reference picture list having the relatively lowest reference picture index and that also has the opposite reference picture type (either short-term or long-term) as the first co-located reference picture. Determining the second co-located reference picture in this way may help to ensure that the TMVP candidates include one temporal candidate and one inter-view or inter-layer candidate.

According to some aspects of this disclosure, video encoder 20 and/or video decoder 30 may rank the first and second TMVP candidates in a motion vector predictor candidate list based on a predetermined priority. For example, for two co-located reference pictures (and two corresponding TMVP candidates), video encoder 20 and/or video decoder 30 may assign a higher priority to the co-located reference picture that corresponds to a long-term type picture. In this example, video encoder 20 and/or video decoder 30 may insert the higher priority TMVP candidate into a merge mode or AMVP relatively earlier in the list than the lower priority TMVP candidate.

In some examples, video encoder 20 and/or video decoder 30 may add the higher priority TMVP candidate to a merge mode or AMVP candidate list prior to one or more spatial motion vector predictor candidates. In other examples, video encoder 20 and/or video decoder 30 may add the higher priority TMVP candidate to any other position of a motion vector predictor candidate list. With respect to the second TMVP candidate, video encoder 20 and/or video decoder 30 may add the second, lower priority TMVP candidate to the merge mode or AMVP candidate list according to the position dictated by the HEVC standard. In other examples, video encoder 20 and/or video decoder 30 may add the second TMVP candidate to any other position of the merge mode or AMVP candidate list. The manner in which video encoder 20 and/or video decoder 30 may construct a candidate list having one or more of the first TMVP candidate and the second TMVP candidate is described in greater detail, for example, with respect to FIG. 8 below.

In some examples, video encoder 20 and/or video decoder 30 may not add both the first TMVP and the second TMVP to a candidate list. For example, according to aspects of this disclosure, video encoder 20 and/or video decoder 30 may keep only one co-located reference picture for determining a TMVP to add to the candidate list. According to some aspects, video encoder 20 and/or video decoder 30 may only add the TMVP candidate associated with the co-located reference picture that corresponds to an inter-view or inter-layer reference picture.

Other techniques of this disclosure relate to determining a co-located block of a co-located picture for determining a TMVP. For example, during inter-view or inter-layer motion vector prediction, video encoder 20 and/or video decoder 30 may typically locate and use the bottom-right block relative to a co-located PU (of a co-located picture) for determining a TMVP. However, at least with respect to inter-layer motion prediction in which different layers may have different resolutions, video encoder 20 and/or video decoder 30 may consider locating and using the motion vector inside the co-located as a TMVP.

That is, according to HEVC, the TMVP candidate derivation process includes identifying the outer and bottom right co-located block of the co-located PU to determine a TMVP. According to aspects of this disclosure, if a co-located reference picture is a long-term reference picture (or an inter-view or inter-layer reference picture), video encoder 20 and/or video decoder 30 may derive the corresponding TMVP candidate from a location that is not located at the outer bottom-right block of the co-located PU.

In one example, according to aspects of this disclosure, video encoder 20 and/or video decoder 30 may use a particular block location by default for determining the co-located block. For example, video encoder 20 and/or video decoder 30 may determine the location of a so-called "Center3" block when the co-located reference picture is a long-term reference picture (e.g., an inter-view or inter-layer reference picture). The Center 3 block may correspond to the 4×4 block that belongs to the bottom-right 4×4 block of the 8×8 block having a center in the same location as the center of the current PU (for which the TMVP is being determined). In HEVC, this so-called Center3 location may be used when the outer bottom right block is located outside of a current LCU. Determining a Center3 block for determining a TMVP in an inter-view or inter-layer reference picture may enable video encoder 20 and/or video decoder 30 to determine the TMVP using only HLS changes to HEVC.

Other aspects of this disclosure relate to motion compression of motion information, e.g., in a DPB. For example, to compress motion information in HEVC, video encoder 20 and/or video decoder 30 may store motion information for each aligned 16×16 block, rather than at the 4×4 or 8×8 block level. Hence, to locate a co-located block in a co-located reference picture for determining a TMVP, video encoder 20 and/or video decoder 30 may perform a right shift or left shift operation to locate the nearest 16×16 block to the location of the co-located block, because that is the location in which the compressed motion information is stored.

However, in a multi-view or multi-layer HLS only application, block level tools (required for determining the appropriate 16×16 motion compression block) are not typically available. Accordingly, video encoder 20 and/or video decoder 30 may not be able to appropriately determine a TMVP associated with a co-located reference picture in another view or layer if the view or layer is motion compressed.

According to aspects of this disclosure, video encoder 20 and/or video decoder 30 may selectively compress reference pictures in a DPB. For example, video encoder 20 and/or video decoder 30 may compress motion information for pictures that are not used as co-located reference pictures for determining a TMVP. However, video encoder 20 and/or video decoder 30 may not compress co-located reference pictures that are used for determining a TMVP. By not performing the motion compression, video encoder 20 and/or video decoder 30 may access the motion information of the co-located picture for determining a TMVP.

Figure 2:
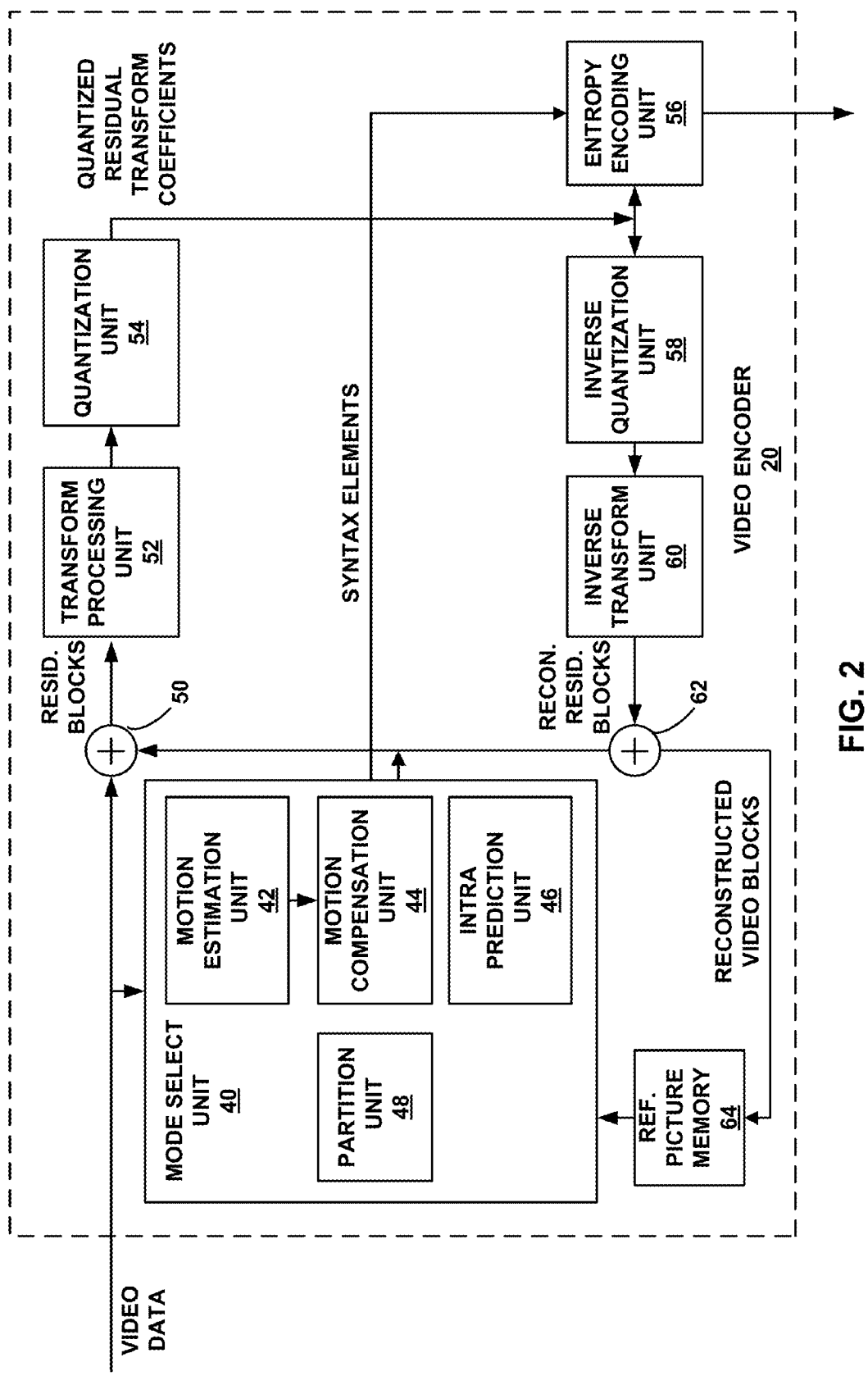
FIG. 2 is a block diagram illustrating an example of a video encoder that may implement techniques for determining one or more TMVPs.

FIG. 2 is a block diagram illustrating an example of video encoder 20 that may implement techniques for determining one or more TMVPs. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As noted above, video encoder 20 may be adapted to perform multiview and/or scalable video coding. For example, video encoder 20 may be configured to encode a bitstream that conforms to one or more video coding standard extensions, such as HSVC, MV-HEVC, or 3D-HEVC. In some examples, video encoder 20 may code video data using HLS-only changes to existing video coding standards. However, while reference is made to specific coding standards, it should be understood that the techniques are not specific to any one coding standard, and may be implemented with future and/or not yet developed standards.

In any case, as shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

When mode select unit 40 elects to inter-predict a block of video data (e.g., a PU) using motion estimation unit 42 and motion compensation unit 44, video encoder 20 may further encode the motion vector, e.g., using AMVP or merge mode. When video encoder 20 signals the motion information of a current PU using merge mode, video encoder 20 may generate a merging candidate list that includes one or more merging candidates. Each of the merging candidates specifies the motion information of a spatial motion vector predictor or a temporal motion vector predictor (i.e., a TMVP).

A spatial motion vector predictor may be a PU in the current picture (i.e., the picture that includes the current PU). A TMVP may be a PU in a temporal reference picture (i.e., a picture that occurs at a different time instance than the current picture). In multilayer video coding, the temporal reference picture may alternatively be included in a picture in a different layer, e.g., an inter-layer reference picture. After generating the merging candidate list, video encoder 20 may select one of the merging candidates. Entropy encoding unit 56 may entropy encode one or more syntax elements that indicate the position, within the merging candidate list, of the selected merging candidate.

Video encoder 20 may perform a similar process, e.g., constructing a candidate list and selecting a candidate from the list, to carry out AMVP. For example, entropy encoding unit 56 may receive a motion vector from mode select unit 40 and encode the motion vector. Entropy encoding unit 56 may entropy encode a motion vector using AMVP by selecting a motion vector predictor included in a motion vector predictor candidate list and calculating a difference between the motion vector and the motion vector predictor (e.g., a horizontal motion vector difference and a vertical motion vector difference), then entropy encode one or more syntax elements representative of the difference(s).

In general, a motion vector may be defined by a horizontal component (or x-component) and a vertical component (or y-component). Accordingly, entropy encoding unit 56 may calculate MVDx (an x-component of a motion vector difference) as the difference between the x-component of the motion vector being encoded and the x-component of the motion vector predictor. Likewise, entropy encoding unit 56 may calculate MVDy (a y-component of the motion vector difference) as the difference between the y-component of the motion vector being encoded and the y-component of the motion vector predictor. In the case that the motion vector is a temporal motion vector, entropy encoding unit 56 may calculate the motion vector difference values (MVDx and MVDy) relative to a scaled version of the motion vector predictor (based on POC differences between reference pictures referred to by the motion vector being encoded and motion vector predictor). Entropy encoding unit 56 may then entropy encode MVDx and MVDy, e.g., using CABAC.

As indicated above, a merging candidate list or an AMVP candidate list may include candidates that specify the motion information of PUs that temporally neighbor a current PU or that are included in a different view or layer than the current PU (in the case of multilayer video coding). This disclosure may use TMVP to refer to a PU that is a temporal or inter-layer neighbor of a current PU and whose motion information is specified by a temporal merging candidate or a temporal MVP candidate.

To determine a TMVP, entropy encoding unit 56 may first identify a reference picture that includes a PU that is co-located with the current PU. In other words, entropy encoding unit 56 may identify a co-located picture. If the current slice of the current picture is a B slice (i.e., a slice that is allowed to include bi-directionally inter predicted PUs), entropy encoding unit 56 may signal, in a slice header, a syntax element (e.g., collocated_from_l0_flag) that indicates whether the co-located picture is from RefPicList0 or RefPicList1. In other words, if the current slice (i.e., the slice containing the current PU) is in a B slice and a collocated_from_l0_flag syntax element in a slice header of the current slice indicates that the co-located reference picture is in RefPicList1, the co-located reference picture may be the reference picture in RefPicList1 at a location indicated by a collocated_ref_idx syntax element of the slice header. Otherwise, if the current slice is a P slice or the current slice is a B slice and the collocated_from_l0_flag syntax element in the slice header of the current slice indicates that the co-located reference picture is in RefPicList0, the co-located reference picture may be the reference picture in RefPicList0 at a location indicated by the collocated_ref_idx syntax element of the slice header. After entropy encoding unit 56 identifies the reference picture list, entropy encoding unit 56 may use another syntax element (e.g., collocated_ref_idx), which may be signaled in a slice header, to identify a picture (i.e., the co-located picture) in the identified reference picture list.

Entropy encoding unit 56 may identify a co-located PU by checking the co-located picture. In some examples, entropy encoding unit 56 may use either the motion of the right-bottom PU of the CU containing this PU, or the motion of the right-bottom PU within the center PUs of the CU containing the co-located PU. The right-bottom PU of the CU containing the co-located PU may be a PU that covers a location immediately below and right of a bottom-right sample of a prediction block of the PU. In other words, the TMVP may be a PU that is in the co-located picture and that covers a location that is co-located with a bottom right corner of the current PU, or the TMVP may be a PU that is in the co-located picture and that covers a location that is co-located with a center of the current PU. Thus, the co-located PU may be a PU that covers a center block of a co-located region of the co-located picture or a PU that covers a bottom-right block of the co-located region of the co-located picture, the co-located region being co-located with the current PU.

According to aspects of this disclosure, entropy encoding unit 56 may determine a co-located PU for a TMVP associated with a different view or layer than the current PU based on a so-called Center 3 location. The Center 3 block may correspond to the 4×4 block that belongs to the bottom-right 4×4 block of the 8×8 block having a center in the same location as the center of the current PU (for which the TMVP is being determined).

Entropy encoding unit 56 may include one or more TMVPs determined using the temporal motion vector prediction process described above as a merging candidate for merge mode or as an MVP candidate for AMVP mode. As noted above, entropy encoding unit 56 may select the candidate having the closest match to the current motion vector as the motion vector predictor.

According to aspects of this disclosure, entropy encoding unit 56 may determine more than one co-located picture and corresponding TMVP for inclusion in the merge mode or AMVP candidate lists. For example, entropy encoding unit 56 may determine a first co-located reference picture for generating a first TMVP candidate in the same view or layer as the picture currently being coded. In addition, entropy encoding unit 56 may determine a second co-located reference picture for generating a second TMVP candidate in a different view or layer than the picture currently being coded.

Entropy encoding unit 56 may, in some instances, signal the second co-located picture for generating the second TMVP candidate in a slice header, e.g., using a similar but distinguishable syntax element as the RefPicListX[collocated_ref_idx] (with X equal to collocated_from_l0_flag) syntax element described above. Entropy encoding unit 56 may determine the second co-located reference picture as the reference picture having the relatively lowest reference picture index (with a reference picture index of zero being the lowest reference picture index) in either RefPicList0 or RefPiclist1. Additionally or alternatively, entropy encoding unit 56 may determine the second co-located reference picture as a picture in a reference picture list that has a different picture type (e.g., either a short-term reference picture or a long-term reference picture) than the reference picture type of the first co-located reference picture.

In some examples, entropy encoding unit 56 may rank the first and second TMVP candidates in a merge mode or AMVP candidate list based on a predetermined priority. For example, entropy encoding unit 56 may assign a higher priority to the co-located reference picture that corresponds to a long-term type picture, and may insert the higher priority TMVP candidate into the merge mode or AMVP candidate list relatively earlier in the list than the lower priority TMVP candidate. In some examples, entropy encoding unit 56 may add the higher priority TMVP candidate to a merge mode or AMVP candidate list prior to one or more spatial motion vector predictor candidates (e.g., motion vectors associated with blocks that spatially neighbor the block currently being coded). Entropy encoding unit 56 may add the lower priority TMVP candidate to the merge mode or AMVP candidate list after the one or more spatial motion vector predictor candidates.

In some examples, entropy encoding unit 56 may not add both the first TMVP and the second TMVP to a candidate list. For example, according to aspects of this disclosure, entropy encoding unit 56 may keep only one co-located reference picture for determining a TMVP to add to the candidate list. In this example, entropy encoding unit 56 may identify a long-term reference picture (inter-view or inter-layer picture) as the co-located picture for determining a TMVP.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Other aspects of this disclosure relate to motion compression of motion information stored to reference picture memory 64. For example, to compress motion information in HEVC, video encoder 20 may store motion information for each aligned 16×16 block, rather than at the 4×4 or 8×8 block level. Hence, to locate a co-located block in a co-located reference picture for determining a TMVP, entropy encoding unit 56 may perform a right shift or left shift operation to locate the 16×16 block that is nearest to the location of the co-located block, because that is the location in which the compressed motion information is stored.

According to aspects of this disclosure, video encoder 20 may selectively compress motion information stored to reference picture memory 64. For example, video encoder 20 may compress motion information for pictures that are not used as co-located reference pictures for determining a TMVP. However, video encoder 20 may not compress co-located reference pictures that are used for determining a TMVP.

In this manner, video encoder 20 of FIG. 2 represents an example of a video encoder configured to determine a first co-located reference picture for generating a first temporal motion vector predictor candidate for predicting a motion vector of a current block, determine a second co-located reference picture for generating a second temporal motion vector predictor candidate for predicting the motion vector of the current block, determine a motion vector predictor candidate list that includes at least one of the first temporal motion vector predictor candidate and the second temporal motion vector predictor candidate, select a motion vector predictor from the motion vector predictor candidate list, and encode the motion vector of the current block relative to the selected motion vector predictor.

Figure 3:
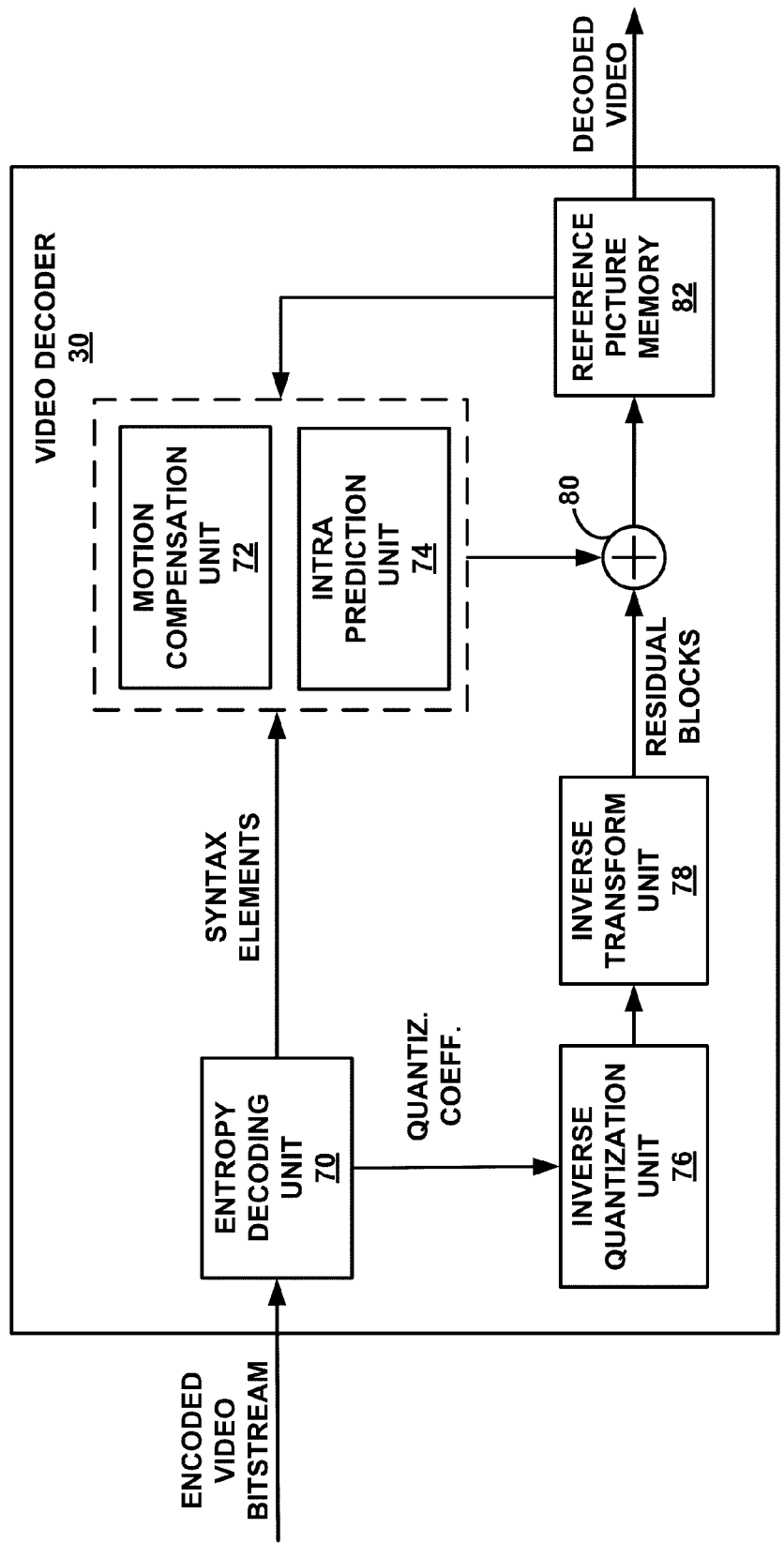
FIG. 3 is a block diagram illustrating an example of video decoder that may implement techniques for determining one or more TMVPs.

FIG. 3 is a block diagram illustrating an example of video decoder 30 that may implement techniques for determining one or more TMVPs using a temporal motion vector prediction process. As noted above, video decoder 30 may be adapted to perform multiview and/or scalable video coding. For example, video decoder 30 may be configured to decode a bitstream that conforms to one or more video coding standard extensions, such as HSVC, MV-HEVC, or 3D-HEVC. In some examples, video decoder 30 may decode video data using HLS-only changes to existing video coding standards. However, while reference is made to specific coding standards, it should be understood that the techniques are not specific to any one coding standard, and may be implemented with future and/or not yet developed standards.

In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Entropy decoding unit 70 may entropy decode motion vectors for P- and B-coded blocks. In some examples, entropy decoding unit 70 may decode motion vectors using AMVP or merge mode, and may determine one or more motion vector predictors (including one or more TMVPs). For example, to decode a current motion vector, entropy decoding unit 70 may select one of a plurality of candidate motion vector predictors (e.g., as indicated by syntax data, or according to an implicit selection process). Video decoder 30 may generate an AMVP or merge mode motion vector predictor candidate list in the same manner as that described above with respect to video encoder 20. In addition, entropy decoding unit 70 may decode a syntax element from an encoded bitstream indicating an index to the list and use may the syntax element to determine the selected motion vector predictor candidate in the candidate list.

Entropy decoding unit 70 may then use the motion information indicated by the selected motion vector predictor candidate to determine the motion information of the current PU. With respect to AMVP, entropy decoding unit 70 may also decode syntax elements representing an MVDx value (that is, a horizontal or x-component of a motion vector difference) and an MVDy value (that is, a vertical or y-component of the motion vector difference). Entropy decoding unit 70 may also add the MVDx value to an x-component of the selected (and potentially scaled) motion vector predictor to reproduce the x-component of the current motion vector, and add the MVDy value to a y-component of the selected (and potentially scaled) motion vector predictor to reproduce the y-component of the current motion vector. Entropy decoding unit 70 may provide the reproduced (i.e., decoded) motion vector to motion compensation unit 72.

In some examples, video decoder 30 and entropy decoding unit 70 may use a temporal motion vector prediction process similar to that described above with respect to FIG. 2 to determine a TMVP. For example, video decoder 30 may first identify a reference picture that includes a PU that is co-located with the current PU. In some examples, video decoder 30 may determine the co-located picture based on a collocated_ref_idx syntax element included in the encoded bitstream, as well as a collocated_from_l0_flag in the case of a B-picture that indicates whether the co-located picture is from RefPicList0 or RefPicList1. Video decoder 30 may then identify a co-located PU by checking the co-located picture. In some examples, video decoder 30 may use either the motion of the right-bottom PU of the CU containing this PU, or the motion of the right-bottom PU within the center PUs of the CU containing the co-located PU.

According to aspects of this disclosure, entropy decoding unit 70 may determine a co-located PU for a TMVP associated with a different view or layer than the current PU based on a so-called Center 3 location. The Center 3 block may correspond to the 4×4 block that belongs to the bottom-right 4×4 block of the 8×8 block having a center in the same location as the center of the current PU (for which the TMVP is being determined).

Entropy decoding unit 70 may include a TMVP determined using the temporal motion vector prediction process described above as a merging candidate for merge mode or as an MVP candidate for AMVP mode. As noted above, entropy decoding unit 70 may select the candidate having the closest match to the current motion vector as the motion vector predictor.

According to aspects of this disclosure, entropy decoding unit 70 may determine more than one co-located picture and corresponding TMVP for inclusion in the merge mode or AMVP candidate lists. For example, entropy decoding unit 70 may determine a first co-located reference picture for generating a first TMVP candidate in the same view or layer as the picture currently being coded. In addition, entropy decoding unit 70 may determine a second co-located reference picture for generating a second TMVP candidate in a different view or layer than the picture currently being coded.

Entropy decoding unit 70 may, in some instances, receive one or more syntax elements in a slice header of an encoded bitstream that indicate the second co-located picture for generating the second TMVP candidate in a slice header, e.g., using a similar but distinguishable syntax element as the RefPicListX[collocated_ref_idx] (with X equal to collocated_from_l0_flag) syntax element described above. Entropy decoding unit 70 may determine the second co-located reference picture as the reference picture having the relatively lowest reference picture index (with a reference picture index of zero being the lowest reference picture index) in either RefPicList0 or RefPiclist1. Additionally or alternatively, entropy decoding unit 70 may determine the second co-located reference picture as a picture in a reference picture list that has a different picture type (e.g., either a short-term reference picture or a long-term reference picture) than the reference picture type of the first co-located reference picture.

In some examples, entropy decoding unit 70 may rank the first and second TMVP candidates in a merge mode or AMVP candidate list based on a predetermined priority. For example, entropy decoding unit 70 may assign a higher priority to the co-located reference picture that corresponds to a long-term type picture, and may insert the higher priority TMVP candidate into the merge mode or AMVP candidate list relatively earlier in the list than the lower priority TMVP candidate. In some examples, entropy decoding unit 70 may add the higher priority TMVP candidate to a merge mode or AMVP candidate list prior to one or more spatial motion vector predictor candidates (e.g., motion vectors associated with blocks that spatially neighbor the block currently being coded). Entropy decoding unit 70 may add the lower priority TMVP candidate to the merge mode or AMVP candidate list after the one or more spatial motion vector predictor candidates.

In some examples, entropy decoding unit 70 may not add both the first TMVP and the second TMVP to a candidate list. For example, according to aspects of this disclosure, entropy decoding unit 70 may keep only one co-located reference picture for determining a TMVP to add to the candidate list. In this example, entropy decoding unit 70 may identify a long-term reference picture (inter-view or inter-layer picture) as the co-located picture for determining a TMVP.

Motion compensation unit 72 may use the decoded motion vectors (including motion vectors decoded relative to a motion vector predictor) to retrieve data from a previously decoded picture, e.g., from reference picture memory 82. Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Other aspects of this disclosure relate to motion compression of motion information stored to reference picture memory 82. For example, to compress motion information in HEVC, video decoder 30 may store motion information for each aligned 16×16 block, rather than at the 4×4 or 8×8 block level. Hence, to locate a co-located block in a co-located reference picture for determining a TMVP, reference picture memory 82 may perform a right shift or left shift operation to locate the 16×16 block that is nearest to the location of the co-located block, because that is the location in which the compressed motion information is stored.

According to aspects of this disclosure, video decoder 30 may selectively compress motion information stored to reference picture memory 64. For example, video decoder 30 may compress motion information for pictures that are not used as co-located reference pictures for determining a TMVP. However, video decoder 30 may not compress co-located reference pictures that are used for determining a TMVP.

In this manner, video decoder 30 of FIG. 3 represents an example of a video decoder configured to determine a first co-located reference picture for generating a first temporal motion vector predictor candidate for predicting a motion vector of a current block, determine a second co-located reference picture for generating a second temporal motion vector predictor candidate for predicting the motion vector of the current block, determine a motion vector predictor candidate list that includes at least one of the first temporal motion vector predictor candidate and the second temporal motion vector predictor candidate, select a motion vector predictor from the motion vector predictor candidate list, and decode the motion vector of the current block relative to the selected motion vector predictor.

Figure 4:
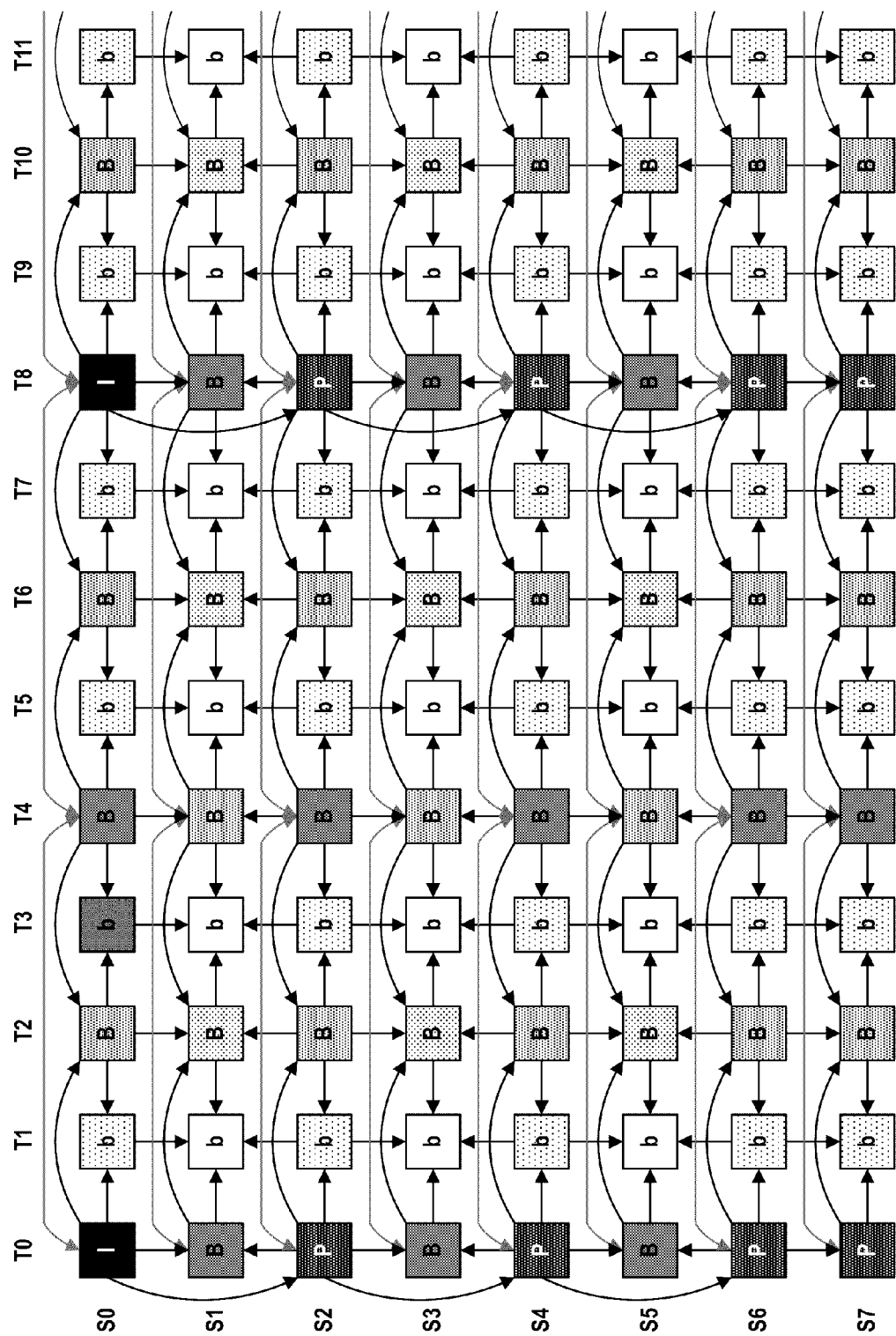
FIG. 4 is a conceptual diagram illustrating an example MVC prediction pattern.

FIG. 4 is a conceptual diagram illustrating an example MVC prediction pattern. While FIG. 4 is described with respect to H.264/AVC and MVC, it should be understood that a similar prediction pattern may be used with other multiview video coding schemes, including MV-HEVC, 3D-HEVC (a multiview plus depth extension to HEVC), and multiview using scalable video coding (see, for example, the scalable video coding example described with respect to FIG. 5). Thus, references to multiview coding and/or MVC below apply to multiview video coding in general, and are not restricted to H.264/MVC.

In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 4 are indicated at the intersection of each row and each column in FIG. 4 using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0.

As with single view video encoding, pictures of a multi-view video coding video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, as an example of multiview video coding, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In MVC, inter-view prediction is allowed among pictures in the same access unit (that is, with the same time instance). An access unit is, generally, a unit of data including all view components (e.g., all network abstraction layer (NAL) units) for a common temporal instance. Thus, in MVC, inter-view prediction is permitted among pictures in the same access unit. When coding a picture in one of the non-base views, the picture may be added into a reference picture list, if it is in a different view but with the same time instance (e.g., the same POC value, and thus, in the same access unit). An inter-view prediction reference picture may be put in any position of a reference picture list, just like any inter prediction reference picture.

FIG. 4 provides various examples of inter-view prediction. Pictures of view S1, in the example of FIG. 4, are illustrated as being predicted from pictures at different temporal locations of view S1, as well as inter-view predicted from pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between pictures, rather than different encoding methodologies. In general, capital "B" pictures are relatively higher in the prediction hierarchy than lowercase "b" pictures. FIG. 4 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. In some examples, the decoding of the view components shall follow the ascending order of the view order index. If all the views are presented, then the view order indexes are in a consecutive order from 0 to num_views_minus 1.

In this manner, pictures used as reference pictures may be decoded before decoding the pictures that are encoded with reference to the reference pictures. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain pictures at equal levels of the hierarchy, decoding order may not matter relative to each other. For example, the I-frame of view S0 at temporal location T0 is used as a reference picture for the P-frame of view S2 at temporal location T0, which is in turn used as a reference picture for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 4. Also, with respect to the example of FIG. 4, S0>S1, S2>S1, S2>S3, S4>S3, S4>S5, and S6>S5. Any decoding order for the views that does not violate these requirements is possible. Accordingly, many different decoding orders are possible.

In some examples, the prediction relationships shown in FIG. 4 may be used for coding motion information. For example, as described above, a motion vector of a current block may be coded relative to a TMVP. In some examples, the co-located reference picture for determining the TMVP may be located in the same view as the current block. In other examples, the co-located reference picture for determining the TMVP may be located in a different view than the current block.

According to aspects of this disclosure, a video coder (such as a video encoder 20 or a video decoder 30) may determine more than one co-located picture and associated TMVP. For example, the video coder may determine one co-located reference picture and associated TMVP in the same view as the block currently being coded. In addition, the video coder may determine another, additional co-located reference picture and associated TMVP in a different view than the block currently being coded.

In an example for purposes of illustration, assume that the video coder is coding a motion vector associated with a block in the B-picture located in view S2 and temporal location T4. In this example, the video coder may determine one co-located reference picture and associated TMVP in the same view as the block currently being coded, e.g., the B-picture located in view S2 and temporal location T2. In addition, the video coder may determine another, additional co-located reference picture and associated TMVP in a different view as the block currently being coded, e.g., the B-picture located in view S1 and temporal location T4, as described in greater detail, for example, with respect to FIG. 7 below.

Figure 5:
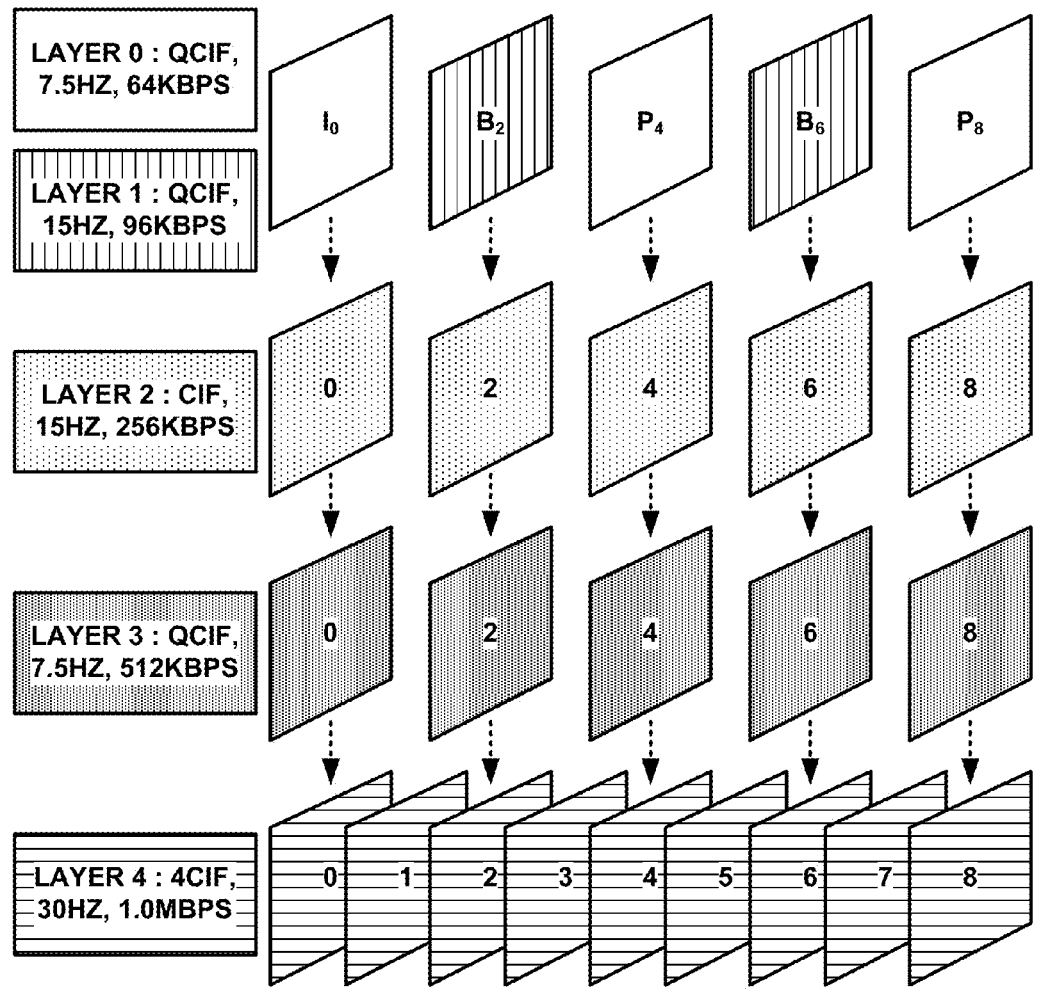
FIG. 5 is a conceptual diagram illustrating an example scalable video coding sequence.

FIG. 5 is a conceptual diagram illustrating scalable video coding. While FIG. 5 is described with respect to H.264/AVC and SVC, it should be understood that similar layers may be coded suing other multilayer video coding schemes, including HSVC. In another example, similar layers may be coded using a multi-standard codec. For example, a base layer may be coded using H.264/AVC, while an enhancement layer may be coded using a scalable, HLS-only extension to HEVC. Thus, references to SVC below may apply to scalable video coding in general, and are not restricted to H.264/SVC.

In SVC, scalabilities may be enabled in three dimensions including, for example, spatial, temporal, and quality (represented as a bit rate or signal to noise ratio (SNR)) dimensions. In general, better representation can be normally achieved by adding to a representation in any dimension. For example, in the example of FIG. 5, layer 0 is coded at Quarter Common Intermediate Format (QCIF) having a frame rate of 7.5 Hz and a bit rate of 64 kilobytes per second (KBPS). In addition, layer 1 is coded at QCIF having a frame rate of 15 Hz and a bit rate of 64 KBPS, layer 2 is coded at CIF having a frame rate of 15 Hz and a bit rate of 256 KBPS, layer 3 is coded at QCIF having a frame rate of 7.5 Hz and a bit rate of 512 KBPS, and layer 4 is coded at 4CIF having a frame rate of 30 Hz and a bit rate of Megabyte per second (MBPS). It should be understood that the particular number, contents and arrangement of the layers shown in FIG. 5 are provided for purposes of example only.

In any case, once a video encoder (such as video encoder 20) has encoded content in such a scalable way, a video decoder (such as video decoder 30) may use an extractor tool to adapt the actual delivered content according to application requirements, which may be dependent e.g., on the client or the transmission channel.

In SVC, pictures having the lowest spatial and quality layer are typically compatible with H.264/AVC. In the example of FIG. 5, pictures with the lowest spatial and quality layer (pictures in layer 0 and layer 1, with QCIF resolution) may be compatible with H.264/AVC. Among them, those pictures of the lowest temporal level form the temporal base layer (layer 0). This temporal base layer (layer 0) may be enhanced with pictures of higher temporal levels (layer 1).

In addition to the H.264/AVC compatible layer, several spatial and/or quality enhancement layers may be added to provide spatial and/or quality scalabilities. Each spatial or quality enhancement layer itself may be temporally scalable, with the same temporal scalability structure as the H.264/AVC compatible layer. In some instances, as noted above, enhancement layers may be coded based on a different coding standard, such as HEVC. That is, for example, in both the SVC and the MVC/3DV context, it is possible to code a base layer with a codec that is different from HEVC, e.g., H.264/AVC, while coding one or more enhancement layers with HEVC.

In an HLS-only HEVC process, if two spatial layers have the same spatial resolution (in some examples, after filtering and/or upsampling), a video coder (such as video encoder 20 or video decoder 30) may perform motion vector prediction in a manner similar to MV-HEVC (using the prediction structure as shown and described with respect to FIG. 4). In this example, the video coder may determine a TMVP, even when the co-located picture is from a different view than the view currently being coded. That is, as noted above, the video coder may add a picture from a different view to a reference picture list, and the video coder may select the picture as a co-located picture for determining a TMVP.

According to aspects of this disclosure, the video coder may determine more than one co-located picture and associated TMVP. For example, the video coder may determine one co-located reference picture and associated TMVP in the same layer as the block currently being coded. In addition, the video coder may determine another, additional co-located reference picture and associated TMVP in a different layer than the block currently being coded.

In an example for purposes of illustration, assume that the video coder is coding a motion vector associated with a block in picture 4 of layer 3. In this example, the video coder may determine one co-located reference picture and associated TMVP in the same layer as the block currently being coded, e.g., in picture 2 of layer 3. In addition, the video coder may determine another, additional co-located reference picture and associated TMVP in a different layer as the block currently being coded, e.g., in picture 4 of layer 2. In some examples, picture 4 of layer 2 may be upsampled prior to performing motion prediction.

Figure 6:
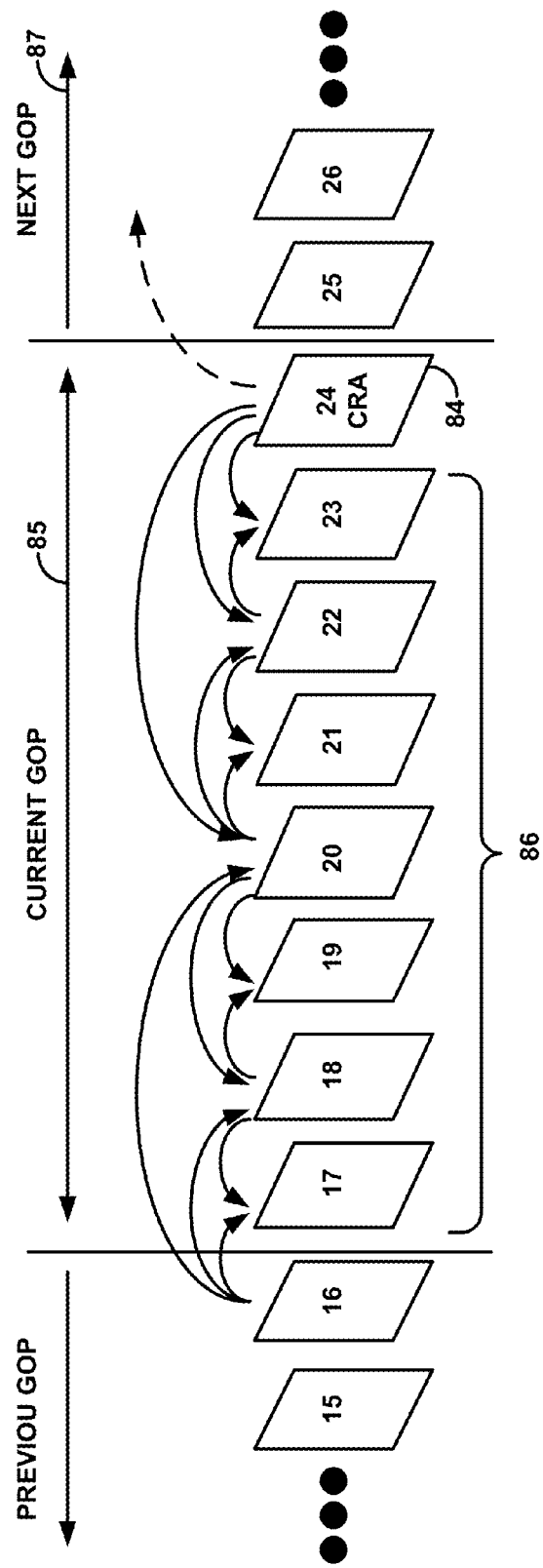
FIG. 6 is a conceptual diagram illustrating an example clean random access (CRA) picture and example leading pictures.

FIG. 6 is a conceptual diagram illustrating an example clean random access (CRA) picture and example leading pictures. For example, in HEVC, in general, there are four picture types that can be identified by the NAL unit type. The four picture types include an instantaneous decoding refresh (IDR) picture, a CRA picture, a temporal layer access (TLA) picture and a coded picture that is not an IDR, CRA or TLA picture. The IDR and the coded pictures are picture types inherited from the H.264/AVC specification. The CRA and the TLA picture types are new additions for the HEVC standard. A CRA picture is a picture type that facilitates decoding beginning from any random access point in the middle of a video sequence, and may be more efficient than inserting IDR pictures. A TLA picture is a picture type that can be used to indicate valid temporal layer switching points.

In video applications, such as broadcasting and streaming, switching may occur between different channels of video data and jumping may occur to specific parts of video data. In such instances, it may be beneficial to achieve minimum delay during switching and/or jumping. This feature is enabled by having random access pictures at regular intervals in the video bitstreams. The IDR picture, specified in both H.264/AVC and HEVC may be used for random access. However, an IDR picture starts a coded video sequence and removes pictures from a decoded picture buffer (DPB) (which may also be referred to as a reference picture memory, as described above with respect to FIGS. 2 and 3). Accordingly, pictures following the IDR picture in decoding order cannot use pictures decoded prior to the IDR picture as a reference. Consequently, bitstreams relying on IDR pictures for random access may have significantly lower coding efficiency (e.g., by approximately 6% versus bitstreams relying on other random access pictures, such as CRA pictures). To improve the coding efficiency, CRA pictures in HEVC allow pictures that follow a CRA picture in decoding order but precede the CRA picture in output order to use pictures decoded before the CRA picture as a reference.

A typical prediction structure around a CRA picture is shown in FIG. 6, where the CRA picture (with POC 24 and denoted as CRA picture 84) belongs to a Group of Pictures (GOP) 85, which contains other pictures (POC 17 through 23) 86, following CRA picture 84 in decoding order but preceding CRA picture 84 in output order. These pictures are called leading pictures 86 of CRA picture 84 and can be correctly decoded if the decoding starts from an IDR or CRA picture before current CRA picture 84. However, leading pictures may not be correctly decoded when random access from this CRA picture 84 occurs. As a result, these leading pictures are typically discarded during the random access decoding.

To prevent error propagation from reference pictures that may not be available depending on where the decoding starts, all pictures in the next GOP 87 as shown in FIG. 6, that follow CRA picture 84 both in decoding order and output order, should not use any picture that precedes CRA picture 84 either in decoding order or output order (which includes the leading pictures) as reference.

Similar random access functionalities are supported in H.264/AVC with the recovery point SEI message. An H.264/AVC decoder implementation may or may not support the functionality. In HEVC, a bitstream starting with a CRA picture is considered a conforming bitstream. When a bitstream starts with a CRA picture, the leading pictures of the CRA picture may refer to unavailable reference pictures and therefore may not be correctly decoded. However, HEVC specifies that the leading pictures of the starting CRA picture are not output, hence the name "clean random access." For establishment of bitstream conformance requirement, HEVC specifies a decoding process to generate unavailable reference pictures for decoding of the non-output leading pictures. However, conforming decoder implementations do not have to follow that decoding process, as long as these conforming decoders can generate identical output compared to when the decoding process is performed from the beginning of the bitstream. In HEVC, a conforming bitstream may contain no IDR pictures at all, and consequently may contain a subset of a coded video sequence or an incomplete coded video sequence.

Besides the IDR and CRA pictures, there are other types of random access point pictures, e.g., a broken link access (BLA) picture. For each of the major types of the random access point pictures, there may be sub-types, depending on how a random access point picture could be potentially treated by systems. Each sub-type of random access point picture has a different NAL unit type.

With respect to extensions of HEVC, such as MV-HEVC or HSVC, a bitstream may be formed such that no coding unit level or lower level changes are required for implementation of MV-HEVC. The concept of random access in HEVC may be extended and applied to extensions of HEVC. Detailed definitions of random access point access units, as well as random access view components are included in the MV-HEVC working draft specification: JCT3V-A1004, entitled "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 and available at http://phenix.it-sudparis.eu/jct2/doc_end_user/documents/1_Stockholm/wg11/JCT3V-A1004-v1.zip.

In general, with respect to a multiview extension of HEVC, whether a view component is a random access point may depend on the NAL unit type of the view component. If the type belongs to those defined in HEVC base specification for random access point pictures, the current view component is a random access point view component (or, for simplicity, random access point picture of the current view).

In some instances, the random access functionality only applies to temporal prediction in a way that certain predictions in the temporal dimension (thus inside a view) is either disabled or constrained similarly as in HEVC base specification. However, inter-view prediction for a random access point view component is still possible, and generally performed to improve coding efficiency, similar to the anchor picture in H.264/MVC. Thus, a random access point (RAP) view component, if using inter-view prediction, may be a P or B picture. In some instances, this above noted concept can be extended to the scalable extension of HEVC or "toward HEVC" multi-standard codec, described below.

With respect to an inter-view reference picture list, a video coder (such as video encoder 20 or video decoder 30) may create an inter-view reference picture based on the view dependency signaled in the video parameter set (VPS). For a current picture, pictures that are in the same access unit and belong to the dependent views (signaled in VPS) may form an inter-view reference picture list. A picture in an inter-view reference picture list may be added into a reference picture list of the current picture.

In HLS-only HEVC, when the two spatial layers have the same spatial resolution, inter-view prediction can be supported similar to MV-HEVC, where a TMVP may be determined from a co-located picture, even when the co-located picture is from a different view. However, in an HLS-only scalable HEVC codec, there should be no changes equal to or below the coding unit level. That is, syntax changes may only be allowed in, for example, a slice header, a sequence parameter set (SPS), a picture parameter set (PPS), a view parameter set (VPS), a network abstraction layer (NAL) unit header, or a supplemental enhancement information (SEI) message. A conforming bitstream must adhere to the lower-level structure defined by HEVC.

Typically, in such a codec (video encoder/decoder), a base layer picture may be inserted into a reference picture list and may be used as a reference picture, in some instances, after upsampling the base layer picture. This process may be similar to an inter-view reference picture in MV-HEVC. Furthermore, multiple representations of the base layer pictures, e.g., generated with different (upsampling) filters, may be added into the same reference picture list.

The techniques of this disclosure include determining more than one co-located picture and associated TMVP. However, as noted above, random access pictures do not include a temporal motion field (e.g., blocks of such pictures are intra-coded or inter-layer coded). Accordingly, when determining a TMVP, according to aspects of this disclosure, a video coder (such as video encoder 20 or video decoder 30) may determine a co-located picture based on whether the reference picture is a long term (inter-view or layer) reference picture. In this example, the video coder may only a single TMVP.

Figure 7:
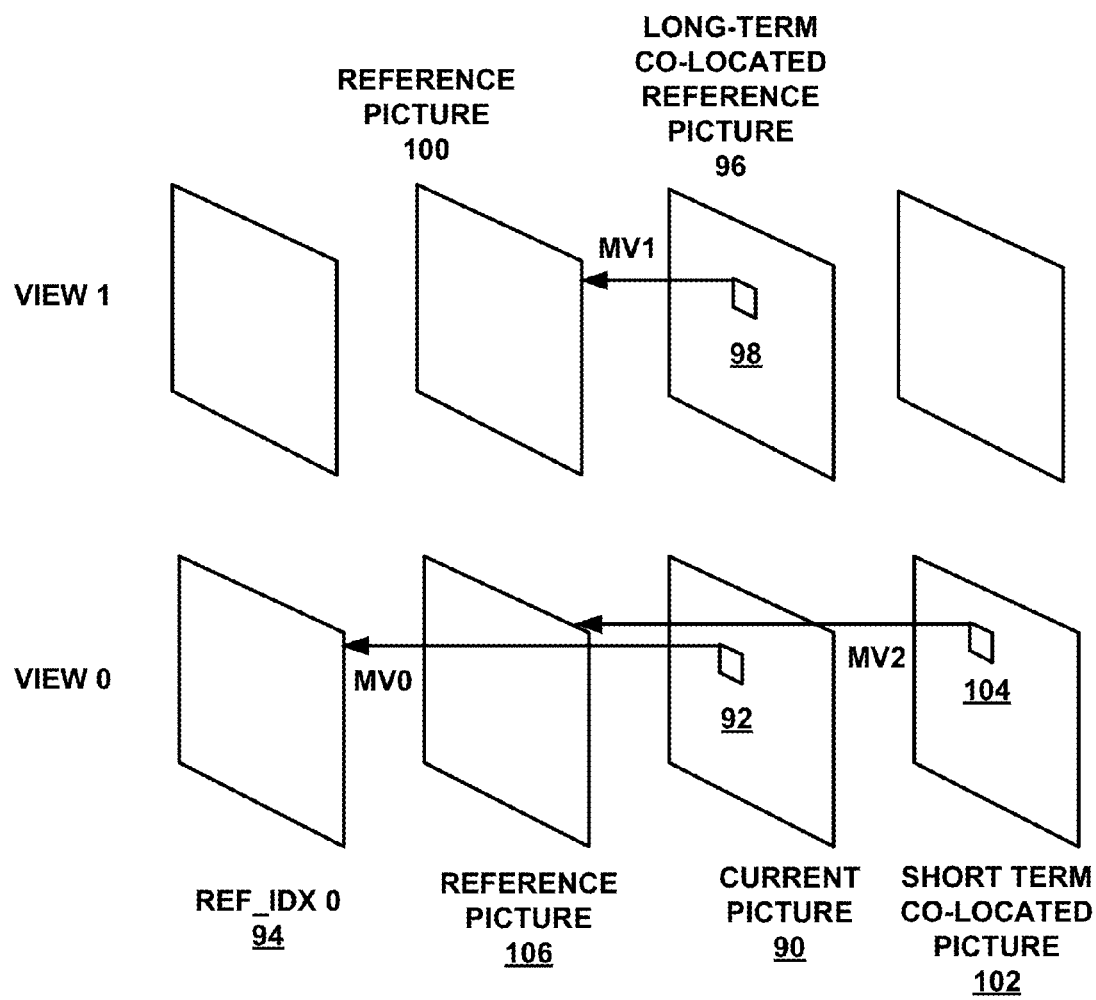
FIG. 7 is a conceptual diagram illustrating determining one or more TMVPs.

FIG. 7 is a conceptual diagram illustrating a process for determining one or more TMVPs. The example shown in FIG. 7 includes a picture currently being coded ("current picture") 90 in view 0 having a block currently being coded 92 and corresponding motion vector (MV0) identifying a block of a reference picture having an index of zero in a reference picture list for the current picture ("ref_idx 0") 94. In addition, the example also includes a long-term co-located reference picture 96 in view 1 having a co-located block 98 and corresponding motion vector (MV1) identifying a block of a reference picture 100 in view 1. The example also includes a short-term co-located reference picture 102 in view 0 having a co-located block 104 and a motion vector (MV2) identifying a block of reference picture 106 in view 0.

Although pictures 96 and 102 are referred to as a "co-located reference pictures," it should be understood that this is intended to refer to a picture that includes a co-located block for block 92 of current picture 90 for determining a TMVP. That is, "co-located reference picture" is used as notational short-hand to refer to a picture including a co-located block for a current block of a current picture, and not necessarily to a picture that is co-located with the current picture. Of course, in some examples, the co-located picture may correspond to an inter-layer reference picture that is indeed temporally co-located with current picture 90, as is long-term co-located picture reference picture 96.

As shown in the example of FIG. 7, according to aspects of this disclosure, a video coder (such as video encoder 20 or video decoder 30) may determine more than one co-located picture for determining a TMVP, including long-term co-located picture 96 and short-term co-located picture 102. For example, to predict motion vector MV0 associated with current block 92, the video coder identifies long-term co-located reference picture 96 having block 98 and motion vector MV1. After identifying long-term co-located reference picture 96, the video coder identifies block 98 by checking long-term co-located picture 96. In this example, the video coder may add motion vector MV1 to a motion vector predictor candidate list (e.g., a merge mode or AMVP candidate list) for predicting motion vector MV0.

In addition, the video coder may identify short-term co-located reference picture 102 having block 104 and motion vector MV2. After identifying short-term co-located reference picture 102, the video coder identifies block 104 by checking short-term co-located picture 102. In this example, the video coder may add motion vector MV2 to a motion vector predictor candidate list (e.g., a merge mode or AMVP candidate list) for predicting motion vector MV0.

In the description below, long-term reference picture 96 correspond to a "first co-located picture," while short-term co-located reference picture 102 may correspond to a "second co-located picture." However, it should be understood that the techniques described below may be applied such that short-term co-located picture 102 corresponds to the first co-located picture and long-term co-located reference picture 96 corresponds to the second co-located picture.

In any case, according to aspects of this disclosure, the video coder may determine the second co-located picture (colPic2) as RefPicListX[collocated_ref_idx], with X equal to collocated_from_l0_flag. In this example, the video coder (e.g., video encoder 20 or video decoder 30) may determine the first co-located picture (colPic1) based on the following:

```
for (i=0; i<= num_ref_idx_l0_active_minus1;i++)
    if (isShortTerm (colPic2) is not equal to
    isShortTerm(RefPicList0[i])) {
        colPic1 is set to be RefPicList0[i].
        return
    }
for (i=0; i<= num_ref_idx_l1_active_minus1;i++)
```

```
if (isShortTerm (colPic2) is not equal to
  isShortTerm(RefPicList1[i])) {
    colPic1 is set to be RefPicList1[i].
    return
  }
where isShotTerm (pic) returns 1 if the picture pic is marked as a
short-term reference picture and 0 if the picture pic is marked as a
long-term reference picture. If the first co-located picture (colPic1) is
unavailable or is a short-term reference picture, colPic1 and colPic2 may
be swapped, i.e., colPic 1 may be used for colPic2 and/or colPic2 may be
used for colPic1.
```

After determining the co-located reference pictures, the video coder may determine a first TMVP (corresponding to the first co-located picture) and a second TMVP (corresponding to the second co-located picture). In an example, for each of the current CU/PU, the video coder may identify its co-located block in the first co-located picture (colPic1) as a first co-located PU (colPU1) and identify its co-located block in the second co-located picture (colPic2) as a second co-located PU (colPU2). In some examples, the video coder may identify each co-located block in a similar manner as that dictated by the HEVC standard, as described above.

In addition, the video coder may determine the first TMVP and the second TMV associated associate with the first and second co-located PUs. For example, the video coder may determine an MVi in colPUi (with i equal to 1 or 2). In some examples, If the motion vector MVi points to a reference picture that is a short-term reference when colPici is used, the video coder may scale the MVi is scaled based on a picture order count (POC) distance to derive TMVPi.

According to some examples, the video coder may determine one or more TMVPs according to the process determine one or more TMVPs according to the process described below (where strikethroughs indicate deletions from HEVC WD8 and bold and italics indicate deviations from or additions to HEVC WD8):

8.5.2.1.7 Derivation Process for Temporal Luma Motion Vector Prediction

Inputs to this process are
  a luma location (xP, yP) specifying the top-left sample of the current luma prediction block relative to the top-left luma sample of the current picture,
  variables specifying the width and the height of the luma prediction block, nPbW and nPbH,
  a reference index refIdxLX (with X being 0 or 1).
Outputs of this process are
  the motion vector prediction mvLXCol,
  the availability flag availableFlagLXCol.
The function RefPicOrderCnt(picX, refIdx, LX) returns the picture order count PicOrderCntVal of the reference picture with index refIdx from reference picture list LX of the picture picX and is specified as follows.

$$RefPicOrderCnt(picX, refIdx, LX) = PicOrderCnt(RefPicListX[refIdx] \text{ of the picture } picX) \quad (8\ 141)$$

Depending on the values of slice_type, collocated_from_l0_flag, and collocated_ref_idx, the variable colPic, specifying the picture that contains the collocated partition, is derived as follows.
  If slice_type is equal to B and collocated_from_l0_flag is equal to 0, the variable colPic specifies the picture that contains the collocated partition as specified by RefPicList1 [collocated_ref_idx].
  Otherwise (slice_type is equal to B and collocated_from_l0_flag is equal to 1 or slice_type is equal to P), the variable colPic specifies the picture that contains the collocated partition as specified by RefPicList0[collocated_ref_idx].

Variable colPb and its position (xPCol, yPCol) are derived in the following ordered steps:
1. If colPic is a short-term reference picture, the variable colPb is derived as follows $$yPRb = yP + nPbH \quad (8\text{-}151)$$

If (yP>>Log 2CtbSizeY) is equal to (yPRb>>Log 2CtbSizeY), the horizontal component of the right-bottom luma location of the current luma prediction block is defined by $$xPRb = xP + nPbW \quad (8\text{-}152)$$

and the variable colPb is set as the luma prediction block covering the modified location given by ((xPRb>>4)<<4, (yPR>>4)<<) inside the colPic.
  Otherwise ((yP>>Log 2CtbSizeY) is not equal to (yPRb>>Log 2CtbSizeY)), colPb is marked as "unavailable".

2. When colPic is not a short-term reference picture (or colPic is a long-term reference picture), or colPb is coded in an intra prediction mode or colPb is marked as "unavailable", the following applies.
  Central luma location of the current prediction block is defined by $$xPCtr = (xP + (nPbW>>1)) \quad (8\text{-}153)$$

$$yPCtr = (yP + (nPbH>>1)) \quad (8\text{-}154)$$

The variable colPb is set as the luma prediction block covering the modified location given by ((xPCtr≥≥4)<<4, (yPCtr≥≥4)<<4) inside the colPic.

3. (xPCol, yPCol) is set equal to the top-left sample of the colPb relative to the top-left luma sample of the colPic. The variables mvLXCol and availableFlagLXCol are derived as follows.
  If one or more of the following conditions are true, both components of mvLXCol are set equal to 0 and availableFlagLXCol is set equal to 0.
    colPb is coded in an intra prediction mode.
    colPb is marked as "unavailable".
    slice_temporal_mvp_enable_flag is equal to 0.
    LongTermRefPic(currPic, refIdxLX, ListX) is not equal to LongTermRefPic(colPic, refIdxCol, listCol).
  Otherwise, the motion vector mvCol, the reference index refIdxCol, and the reference list identifier listCol are derived as follows.
    If PredFlagL0[xPCol][yPCol] is equal to 0, mvCol, refIdxCol, and listCol are set equal to MvL1[xPCol][yPCol], RefIdxL1[xPCol][yPCol], and L1, respectively.
    Otherwise (PredFlagL0[xPCol][yPCol] is equal to 1), the following applies.
      If PredFlagL1[xPCol][yPCol] is equal to 0, mvCol, refIdxCol, and listCol are set equal to MvL0[xPCol][yPCol], RefIdxL0[xPCol][yPCol], and L0, respectively.
      Otherwise (PredFlagL1[xPCol][yPCol] is equal to 1), the following assignments are made.
        If PicOrderCnt(pic) of every picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdx-Col and listCol are set equal to MvLN[xPCol][yPCol], RefIdxLN[xPCol][yPCol] and LN, respectively with N being the value of collocated_from_l0_flag.

and the variable availableFlagLXCol is set equal to 1 and the following applies.

If RefPicListX[refIdxLX] is a long-term reference picture, or PicOrderCnt(colPic)−RefPicOrderCnt (colPic, refIdxCol, listCol) is equal to PicOrderCntVal−PicOrderCnt(RefPicListX[refIdxLX]), $$mvLXCol = mvCol \quad (8\text{-}155)$$

Otherwise, mvLXCol is derived as scaled version of the motion vector mvCol as specified below $$tx = (16384 + (Abs(td) >> 1))/td \quad (8\text{-}156)$$

$$distScaleFactor = Clip3(-4096, 4095, (tb * tx + 32) >> 6) \quad (8\text{-}157)$$

$$mvLXCol = Clip3(-32768, 32767, Sign2 \\ (distScaleFactor * mvCol) * ((Abs \\ (distScaleFactor * mvCol) + 127) >> 8)) \quad (8\text{-}158)$$

where td and tb are derived as $$td = Clip3(-128, 127, PicOrderCnt(colPic) - RefPicOrderCnt(colPic, refIdxCol, listCol)) \quad (8\text{-}159)$$

$$tb = Clip3(-128, 127, PicOrderCntVal - PicOrderCnt \\ (RefPicListX[refIdxLX])) \quad (8\text{-}160)$$

According to the example above, the video coder determines the actual location of the co-located Pus. Alternatively or additionally, if the co-located picture (colPic) is not a short-term reference picture (or colPic is a long-term reference picture) and the co-located PU is marked as "unavailable" in a reference picture memory (e.g., colPb is marked as "unavailable"), the video coder may use another sub-block inside or outside of the current co-located PU for TMVP derivation. For example, if colPb is marked as unavailable, the video coder may use a PU that is located to the bottom-right or top-left sub-block of the co-located PU for TMVP derivation.

This example may be carried out according to the process below (where strikethroughs indicate deletions from HEVC WD8 and bold and italics indicate deviations from or additions to HEVC WD8):

8.5.2.1.7 Derivation Process for Temporal Luma Motion Vector Prediction
Inputs to this Process are
   a luma location (xP, yP) specifying the top-left sample of the current luma prediction block relative to the top-left luma sample of the current picture,
   variables specifying the width and the height of the luma prediction block, nPbW and nPbH,
   a reference index refIdxLX (with X being 0 or 1).
Outputs of this process are
   the motion vector prediction mvLXCol,
   the availability flag availableFlagLXCol.
The function RefPicOrderCnt(picX, refIdx, LX) returns the picture order count PicOrderCntVal of the reference picture with index refIdx from reference picture list LX of the picture picX and is specified as follows.

$$RefPicOrderCnt(picX, refIdx, LX) = PicOrderCnt(RefPicListX[refIdx] \text{ of the picture } picX) \quad (8\text{-}141)$$

Depending on the values of slice_type, collocated_from_l0_flag, and collocated_ref_idx, the variable colPic, specifying the picture that contains the collocated partition, is derived as follows.
   If slice_type is equal to B and collocated_from_l0_flag is equal to 0, the variable colPic specifies the picture that contains the collocated partition as specified by RefPicList1 [collocated_ref_idx].
   Otherwise (slice_type is equal to B and collocated_from_l0_flag is equal to 1 or slice_type is equal to P), the variable colPic specifies the picture that contains the collocated partition as specified by RefPicList0[collocated_ref_idx].
Variable colPb and its position (xPCol, yPCol) are derived in the following ordered steps:
   4. The variable colPb is derived as follows $$yPRb = yP + nPbH \quad (8\text{-}151)$$

If (yP>>Log 2CtbSizeY) is equal to (yPRb>>Log 2CtbSizeY), the horizontal component of the right-bottom luma location of the current luma prediction block is defined by $$xPRb = xP + nPbW \quad (8\text{-}152)$$

and the variable colPb is set as the luma prediction block covering the modified location given by ((xPRb>>4)<<4, (yPRb>>4)<<4) inside the colPic.
   Otherwise ((yP>>Log 2CtbSizeY) is not equal to (yPRb>>Log 2CtbSizeY)), colPb is marked as "unavailable".
   5. When colPic is not a short-term reference picture (or colPic is a long-term reference picture), or colPb is coded in an intra prediction mode or colPb is marked as "unavailable", the following applies.
   Central luma location of the current prediction block is defined by $$xPCtr = (xP + (nPbW >> 1)) \quad (8\text{-}153)$$

$$yPCtr = (yP + (nPbH >> 1)) \quad (8\text{-}154)$$

The variable colPbT is set as the luma prediction block covering the modified location given by ((xPCtr>>4)<<4, (yPCtr>>4)<<4) inside the colPic.
   If colPbT is marked as "available", colPb is set to colPbT.
   6. (xPCol, yPCol) is set equal to the top-left sample of the colPb relative to the top-left luma sample of the colPic.

As noted above, other aspects of this disclosure relate to motion compression. For example, when supporting the inter-view or inter-layer motion prediction in an HLS-only scalable or multiview/3DV HEVC video coding device, motion vectors of a co-located inter-view or inter-layer motion picture (e.g., such as long-term co-located reference picture 96) may increase coding efficiency when used for prediction. However, HEVC typically performs motion compression on all reference pictures stored to a reference picture memory, as noted above.

HEVC does not allow the video coder to skip motion compression unless coding unit level changes are made. For example, in HEVC, a motion field is determined in a real-time manner, such that when accessing any 4×4 block inside an aligned (compressed) motion field 16×16 block, the motion vector of the top-left corner block within the aligned 16×16 block is used. This design requires CU level processes to handle the motion compression, which, are not permitted in HLS-only coding.

According to aspects of this disclosure, the video coder may perform motion compression in a way that supports inter-view or inter-layer motion prediction in a scalable or multiview codec based on HEVC. For example, as noted above, the video coder may selectively compress motion information based on whether a picture is a co-located picture. That is, according to aspects of this disclosure, the video coder may perform motion compression at the picture level and motion compression is not performed on pictures that are accessed for determining a TMVP. In this way, the video coder may access motion vectors and perform motion prediction without implementing a CU-level process In an example for purposes of illustration, the video coder may use a variable toCompressFlag syntax element for each reference picture (e.g., in a reference picture list or reference picture set) to determine whether motion compression is performed. A toCompressFlag syntax element that is equal to 1 may indicate that motion compression is performed for the picture, and a toCompressFlag syntax element that is equal to 0 may indicate that motion compression is not performed for the picture.

In some instances, the video coder may set the toCompressFlag differently, depending on the particularly video coding standard being implemented by the video coder. For example, with respect to the HEVC base standard, the video coder may by default set the toCompressFlag to 1 for each picture. Alternatively, a video coder may set the toCompressFlag to 1 for short-term reference pictures and to 0 for long-term reference pictures (inter-view or inter-layer reference pictures). In still other examples, the value of toCompressFlag may be set to a value by a device other than the video coding device.

In another example, in an extension to HEVC (such as a scalable extension to HEVC, HV-HEVC, or 3D-HEVC), the video coder may determine the value of the toCompressFlag syntax element based on values explicitly signaled in the bitstream or implicitly derived for each inter-view or inter-layer reference picture. For example, the video coder may derive the toCompressFlag to be 0 if the picture belongs to an inter-layer reference picture set (similar to an inter-view reference picture set in MV-HEVC). For each picture in other reference picture set subsets, e.g., RefPicSetLtCurr, RefPicSetLtFoll, RefPicSetStCurrBefore, RefPicSetStCurrAfter or RefPicSetStFoll, the video coder may set the toCompressFlag syntax element to 1. According to other examples, the toCompressFlag may be signaled in a sequence parameter set (SPS), a picture parameter set (PPS), or a slice header for each reference picture subset, or a union of reference picture set subsets.

According to aspects of this disclosure, the video coder may perform the selective compression process at various stages of the coding process, including, for example, immediately after a picture is decoded, or immediately after a picture is marked according to the reference picture marking scheme described in sub-clause 8.3.2 of HEVC. In the latter case, if the picture is marked as a short-term or long-term reference picture and the picture is not marked as "motion compressed" (MotionCompressedFlag equal to 0), the video coder may mark the picture as "motion compressed" (MotionCompressedFlag set to 1). Alternatively, the video coder may compress only short-term pictures.

In other examples, the video coder may perform compression at any time after a picture is decoded and before the picture is used as a co-located picture. In still other examples, the video coder may perform compression at any time after a picture is decoded and before the picture is stored into the decoded picture buffer.

According to aspects of this disclosure, a picture level motion compression process may be defined according to the following process:

```
for (x = 0; x< ((PicWidthInSamples_L+3)>>2); x+=4)
    for (y = 0; y< ((PicHeightInSamples_L+3)>>2); y+=4) {
        RefIdxL0[ x ][ y ] = RefIdxL0[( x >> 4 ) << 4 ][ ( y >> 4 ) << 4 ]
        if (RefIdxL0[ x ][ y ]) MvL0[ x ][ y ]= MvL0[( x >> 4 ) << 4 ][ ( y >> 4 ) << 4 ]
        RefIdxL1[ x ][ y ] = RefIdxL1[( x >> 4 ) << 4 ][ ( y >> 4 ) << 4 ]
        if (RefIdxL1[ x ][ y ]) MvL1[ x ][ y ]= MvL1[( x >> 4 ) << 4 ][ ( y >> 4 ) << 4 ]
    }
```

MotionCompressedFlag of picture pic is set to 1.

In some examples, when a picture is decoded, the video coder may set MotionCompressedFlag to 0.

A conforming video coder may implement the above motion compression process in a way that it keeps a relatively small buffer size of only two motion vectors (MvL0 and MvL1) for each aligned 16×16 block. Accordingly, the video coder need not store real motion vectors at the 4×4 block level. Similarly, the video coder need not set of the motion vectors for each 4×4 block of the aligned 16×16 block.

For example, in the example below, the compressed motion field may be indicated with RefIdxL0N, RefIdxL1N, MvL1N and MvL0N. In addition, the old motion field (the uncompressed motion field) may still be indicated by variables RefIdxL0, RefIdxL1, MvL1 and MvL0. In this example, the video coder may use the following process for motion compression:

```
for (x = 0; x< ((PicWidthInSamples_L+15)>>4); x+=16)
    for (y = 0; y< ((PicHeightInSamples_L+15)>>4); y+=16) {
        RefIdxL0N[ x ][ y ] = RefIdxL0[x][y]
        if (RefIdxL0N[ x ][ y ]) MvL0N[ x ][ y ]= MvL0[ x ][ y ]
        RefIdxL1N[ x ][ y ] = RefIdxL1[x][y]
        if (RefIdxL1N[ x ][ y ]) MvL1N[ x ][ y ]= MvL1[ x ][ y ]
    }
```

In addition, the video coder may not perform the coding unit/prediction unit level motion compression, for example, as defined by the HEVC specification.

The example motion compression techniques may be carried out according to the process below (where strikethroughs indicate deletions from HEVC WD8 and bold and italics indicate deviations from or additions to HEVC WD8):

8.5.2.1.7 Derivation Process for Temporal Luma Motion Vector Prediction

Inputs to this Process are
  a luma location (xP, yP) specifying the top-left sample of the current luma prediction block relative to the top-left luma sample of the current picture,
  variables specifying the width and the height of the luma prediction block, nPbW and nPbH,
  a reference index refIdxLX (with X being 0 or 1).

Outputs of this process are
  the motion vector prediction mvLXCol,
  the availability flag availableFlagLXCol.

The function RefPicOrderCnt(picX, refIdx, LX) returns the picture order count PicOrderCntVal of the reference picture with index refIdx from reference picture list LX of the picture picX and is specified as follows.

RefPicOrderCnt(picX,refIdx,LX)=PicOrderCnt(RefPicListX[refIdx] of the picture picX)  (8-141)

Depending on the values of slicetype, collocated_from_l0_flag, and collocated_ref_idx, the variable colPic, specifying the picture that contains the collocated partition, is derived as follows.

If slice_type is equal to B and collocated_from_l0_flag is equal to 0, the variable colPic specifies the picture that contains the collocated partition as specified by RefPicList1 [collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

Variable colPb and its position (xPCol, yPCol) are derived in the following ordered steps:

7. The variable colPb is derived as follows yPRb=yP+nPbH  (8-151)

If (yP>>Log 2CtbSizeY) is equal to (yPRb>>Log 2CtbSizeY), the horizontal component of the right-bottom luma location of the current luma prediction block is defined by xPRb=xP+nPbW  (8-152)

and the variable colPb is set as the luma prediction block covering the modified location given by (xPRb, yPRb) inside the colPic.

Otherwise ((yP>>Log 2CtbSizeY) is not equal to (yPRb>>Log 2CtbSizeY)), colPb is marked as "unavailable".

8. When colPb is coded in an intra prediction mode or colPb is marked as "unavailable", the following applies.

Central luma location of the current prediction block is defined by xPCtr=(xP+(nPbW>>1)  (8-153)

yPCtr=(yP+(nPbH>>1)  (8-154)

The variable colPb is set as the luma prediction block covering the modified location given by (xPCtr, yPCtr) inside the colPic.

(xPCol, yPCol) is set equal to the top-left sample of the colPb relative to the top-left luma sample of the colPic.

In some examples, the video coder may selectively invoke the picture level motion compression process. For example, the video coder may conditionally invoke the picture level motion compression process according to the process below (where strikethroughs indicate deletions from HEVC and bold and italics indicate deviations from or additions to HEVC):

8.3.2 Decoding Process for Reference Picture Set

This process is invoked once per picture, after decoding of a slice header but prior to the decoding of any coding unit and prior to the decoding process for reference picture list construction of the slice as specified in subclause 8.3.3. The process may result in marking one or more reference pictures as "unused for reference" or "used for long-term reference".

. . .

1. . . .

for(i=0; i<NumPocLtCurr; i++)
if(!CurrDeltaPocMsbPresentFlag[i])

All reference pictures included in RefPicSetLtCurr and RefPicSetLtFoll are marked as "used for long-term reference".

2. . . .
3. . . .
4. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference".
5. The toCompressFlag of each picture in inter-layer reference picture set is set to 0.
6. For each picture pic included in RefPicSetLtCurr, RefPicSetLtFoll, RefPicSetStCurrBefore, RefPicSetStCurrAfter or RefPicSetStFoll, if its MotionCompressedFlag is 0 and toCompressFlag of pic is equal to 1, picture level motion compression process is invoked for picture pic.

Figure 8:
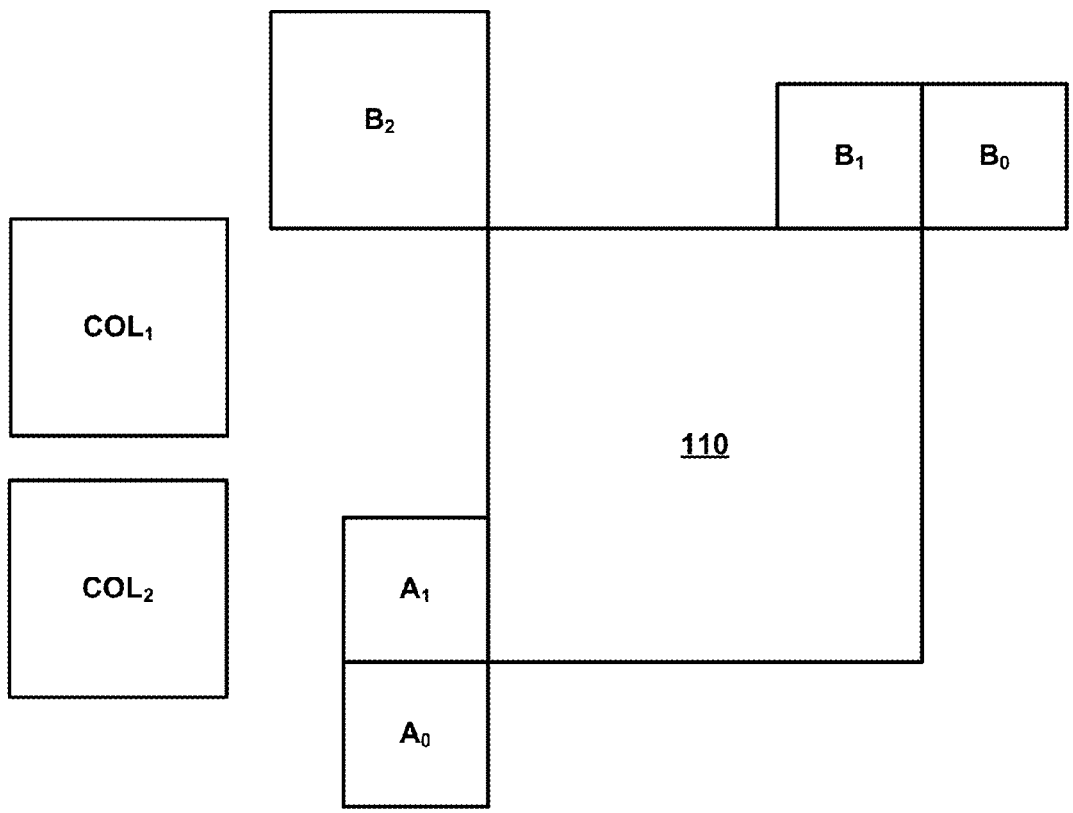
FIG. 8 is a block diagram illustrating example locations for motion vector predictor candidates.

FIG. 8 is a block diagram illustrating potential motion vector predictor candidates when performing motion vector prediction. In the example of FIG. 8, the video coder may predict motion information (e.g., a motion vector comprising a horizontal component and a vertical component, motion vector indexes, prediction directions, or other information) for a block currently being coded 110 from spatial candidates including neighboring blocks $A_0$, $A_1$, $B_0$, $B_1$, and $B_2$. In addition, the video coder may predict motion information for block 110 from one or more temporal or inter-view/inter-layer candidates, as represented by a first co-located block $COL_1$ and a second co-located block $COL_2$. That is, while spatial candidates $A_0$, $A_1$, $B_0$, $B_1$, and $B_2$ are included in the same picture as block 110, the co-located blocks $COL_1$ and $COL_2$ may be included in a picture in a different temporal instance as the picture containing block 110 or in a different view or layer than the picture containing block 110. Such temporal or inter-view/inter-layer candidates may be referred to as TMVPs.

The example of FIG. 8 is described with respect to merge mode. For example, the potential motion vector predictor candidates shown in FIG. 8 may be considered by a video coder (such as video encoder 20 or video decoder 30) when using merge mode to predict a motion vector. Although generally described with respect to merge mode, it should be understood that the techniques may also be applied to other potential motion vector predictor candidates, such as motion vector predictor candidates associated with AMVP, as described in greater detail below.

In any case, the video coder may initially determine which motion vectors from the motion vector predictor candidates are available to merge with block 110. In some instances, motion information from one or more of the motion vector predictor candidates may be unavailable due to, for example, the motion vector predictor candidate being intra-coded, not yet coded, or non-existent (e.g., one or more of the motion vector predictor candidates are located in another picture or slice).

To determine whether a particular motion vector predictor is available, the video coder may locate the motion vector for each predictor, e.g. the PU. For example, with respect to $COL_1$ and $COL_2$, the video coder may locate the co-located PU in a picture in another temporal location or a picture in another view or layer.

According to aspects of this disclosure, when a co-located picture is a long-term reference picture (inter-view or inter-layer reference picture), the location of the co-located PU can be replaced by any sub-block situated inside or outside the co-locate PU, such as a corner or center sub-block. Such techniques may be applicable regardless of whether the video coder determines more than one co-located picture. According to some examples, as described above in the first example section 8.5.2,1.7 above, the video coder may identify the co-located PU using the so-called Center3 block. The Center3 block is the block used in current TMVP derivation process of the HEVC WD8 specification when the bottom-right block is unavailable.

The video coder may construct a motion vector predictor candidate list that includes each of the available motion vector predictor candidate blocks. In general, the motion vector predictor candidate list for merge mode contains up to five candidates. For example, according to HEVC, the video coder may construct a merge candidate list (e.g., mergeCandList) according to the following process:

i=0
  if(availableFlag$A_1$)
    mergeCandList[i++]=$A_1$
  if(availableFlag$B_1$)
    mergeCandList[i++]=$B_1$
  if(availableFlag$B_0$)
    mergeCandList[i++]=$B_0$
  if(availableFlag$A_0$)
    mergeCandList[i++]=$A_0$
  if(availableFlag$B_2$)
    mergeCandList[i++]=$B_2$
  if(availableFlagCol)
    mergeCandList[i++]=Col where Col is either $COL_1$ or $COL_2$ shown FIG. 8. Thus, when following the process set forth in HEVC, the video coder (e.g., video encoder 20 or video decoder 30) may construct the merge candidate list according the following steps:

1) Add spatial merging candidates: the video coder may add up to four spatial motion vector predictor candidates from five spatial neighboring, as shown in FIG. 8. As noted above, the video coder may add the spatial candidates in the following order: left ($A_1$), above ($B_1$), above right ($B_0$), below left ($A_0$), and above left ($B_2$). The video coder may apply a pruning process to remove any identical candidates. For example, the video coder may compare $B_1$ to $A_1$, the video coder may compare $B_0$ to B1, the video coder may compare $A_0$ to A1, and the video coder may compare $B_2$ to both $B_1$ and $A_1$. If any of the candidates are the same, the video coder may remove one of the matching candidates from the list. If there are already four candidates available after the pruning process, the video coder may refrain from adding the candidate from $B_2$ to the candidate list 2) Add temporal merging candidates: the video coder may add a TMVP candidate from the co-located reference picture (COL) if the TMVP determination process is enabled and the if the motion vector from COL is available. In some examples, the video coder may add the TMVP to the list after the spatial candidates.

3) Add artificial motion vector candidates: the video coder may add so-called artificial candidates to the candidate list if the motion vector candidate list is not complete. The video coder may determine the artificial candidates according to a predetermined process. The video coder may add the artificial candidates, if any, to the relative end of the candidate list.

The example above includes a single co-located picture and associated TMVP. According to aspects of this disclosure, the video coder may determine an additional co-located picture and associated TMVP. That is, the video coder may add one or both of the TMVPs derived from $COL_1$ and $COL_2$ to the candidate list.

For example, according to aspects of this disclosure, the video coder may determine a first co-located picture that includes co-located block $COL_1$ and a second co-located picture that includes co-located block $COL_2$. In this example, the video coder may determine a first TMVP associated with $COL_1$ and a second TMVP associated with $COL_2$.

In some examples, the video coder may prioritize the first and second TMVP candidates for inclusion in the candidate list. For example, the video coder may assign a higher priority to the co-located picture that is a long-term reference picture. Thus, assuming for purposes of explanation that $COL_1$ is included in a long-term reference picture (or inter-view or inter-layer reference picture), the video coder may assign a higher priority to the first TMVP. Accordingly, the video coder may add the first TMVP to the candidate list before the second TMVP.

In the example above, the video coder may add the first TMVP to the candidate list prior to spatial candidates $A_0$, $A_1$, $B_0$, $B_1$, and $B_2$. In other examples, the video coder may add the first TMVP to any other position of the candidate list.

In the example above, the video coder may add the second TMVP to the candidate list in the same manner as the HEVC standard (described above). That is, the video coder may add the second TMVP to the candidate list following spatial candidates $A_0$, $A_1$, $B_0$, $B_1$, and $B_2$. In other examples, the video coder may add the second TMVP to any other position of the candidate list.

Accordingly, in at least one example the video coder may form the motion vector predictor candidate list according to the following process:

1) Insert the first TMVP, when available, as the first candidate in the motion vector predictor candidate list
2) Insert one or more spatial motion vector candidates into the motion vector predictor candidate list. In some examples, the video coder may perform this step in the same manner as is performed in HEVC and described above.
3) Insert the second TMVP, when available, to the motion vector predictor candidate list. In some examples, the video coder may perform this step in the same manner as is performed in HEVC and described above.

In some examples, the video coder may prune one or more candidates in the candidate list during step 2 and/or step 3.

In general, the HEVC standard limits the number of motion vector predictor candidates that may be added to the motion vector predictor candidate list. For example, the merge mode motion vector candidate list may be limited to five candidates, while the AMVP candidate list may be limited to two candidates (as described in greater detail below). According to aspects of this disclosure, when generating an additional TMVP candidate in the manner described above, the final number of motion vector predictor candidates for the motion vector predictor candidate list may be increased relative to the HEVC standard to accommodate the additional TMVP. For example, the final number of merge candidates may be increased to six. As another example, the final number of AMVP candidates may be increased to three.

In other examples, one or both of the first TMVP and the second TMVP may be unavailable (e.g., one or both of $COL_1$ and $COL_2$ are intra-predicted). In such examples, the video coder may not insert the unavailable TMVP into the candidate list, and total number of candidates may not be increased. Alternatively, an unavailable TMVP may be replaced by a predefined candidate, e.g., by a zero motion vector and zero reference index. Alternatively, an unavailable TMVP may be replaced by a predefined candidate, e.g., a zero motion vector and a reference index corresponding to the first inter-view or inter-layer (long-term) reference picture in a reference picture list.

In some instances, the video coder may replace one or more candidates in the five position candidate list described above. In this example, the video coder may not increase the size of the candidate list. For example, according to some aspects, the video coder may replace one or more of the spatial candidates with the first TMVP or the second TMVP. In other examples, the video coder may replace a normal TMVP candidate (associated with a temporal reference picture, e.g., $COL_2$) with the first TMVP (associated with a long-term reference picture (inter-view or inter-layer reference picture)).

According to some examples, the video coder may use the first TMVP and/or the second TMVP as so-called artificial motion vector predictor candidates, e.g., in addition to or replacing one or more of the artificial motion vector predictor techniques defined by HEVC. For example, the video coder may use the second TMVP as a normal TMVP (associated with the fifth position in the merge mode list above) and may use the first TMVP as an artificial candidate. In this example, the video coder may insert the first TMVP in the candidate list following the second TMVP in instances in which the candidate list is not complete (e.g., the list does not have five candidates due to unavailability of one or more of the candidates). In other examples, the video coder may reverse the manner in which the first TMVP and the second TMVP are used in the example above.

In some examples, the video coder may perform pruning on the first TMVP and the second TMVP if the first TMVP is equal to the second TMVP. In such examples, the video coder may remove one of the TMVPs from the candidate list, such that the candidate list includes only one TMVP. The video coder may add the remaining TMVP to the candidate list prior to or after the spatial candidates.

In some examples, the video coder may include at least one TMVP in the pruning process that is used in HEVC. In other examples, the video coder may implement an additional or alternative pruning process to avoid duplicate candidates in the candidate list. For example, the video coder may selectively compare a sub-set of the spatial candidates to the first TMVP (e.g., $A_1$ and $B_1$). In another example, the video coder may conditionally switch from the conventional pruning process performed in HEVC to another pruning process if both TMVPs are determined and included in the candidate list. For example, if both the first and second TMVPs are available and included in the candidate list, the video coder may apply full pruning (e.g., comparing all candidates to determine potential duplicates). In still another example, the video coder may exclude the first TMVP and the second TMVP from the pruning process.

While the examples describe above are described with respect to a five position merge mode candidate list. In other examples, the techniques may be applied to a motion vector predictor candidate list for AMVP. In AMVP, the video coder may use a shorter candidate list, e.g., including only two candidates.

According to some aspects, the video coder may insert the first TMVP and/or the second TMVP into the candidate list in different positions or replace one or more spatial candidates depending on whether merge or AMVP is used, e.g., based on a merge flag. In another example, the video coder may use multiple TMVP candidates in a merge mode candidate list, but may only use one TMVP candidate in an AMVP candidate list, or vice versa.

In any case, after constructing the candidate list, the video coder may select a motion vector from the candidate list to be used as the motion vector predictor for the motion vector of current block 110, as described herein.

In some examples, one or $COL_1$ or $COL_2$ may have a reference picture index equal to zero. In other examples, the video coder may select a co-located picture that does not have a reference index equal to 0, because a TMVP derived from such a picture may be considered unavailable in HEVC.

Figure 9:
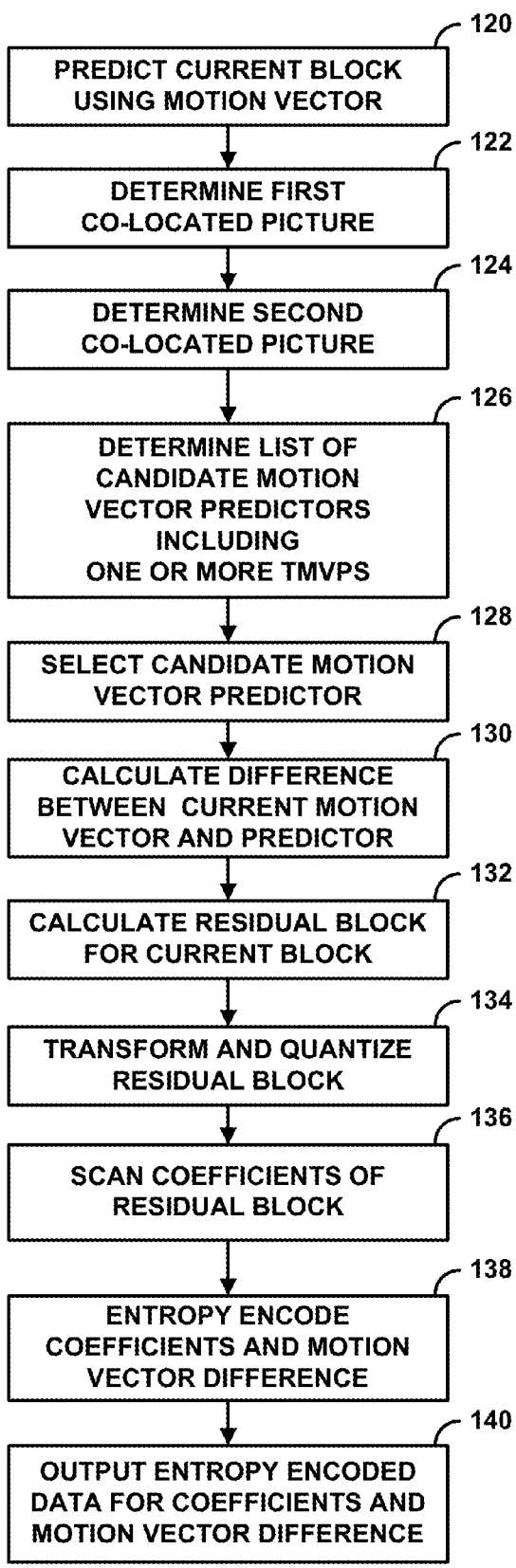
FIG. 9 is a flowchart illustrating an example method for encoding a current block in accordance with the techniques of this disclosure.

FIG. 9 is a flowchart illustrating an example method for encoding a current block in accordance with the techniques of this disclosure. The current block may comprise a current CU or a portion of the current CU, e.g., a current PU. Although described with respect to video encoder 20 (FIGS. 1 and 2), it should be understood that other devices may be configured to perform a method similar to that of FIG. 9.

In this example, video encoder 20 initially predicts the current block (120) using a motion vector. For example, video encoder 20 may calculate one or more prediction units (PUs) for the current block. In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to encode the current block.

Video encoder 20 may then encode the motion vector. According to aspects of this disclosure, video encoder 20 may determine more than one TMVP for predicting the motion vector. Accordingly, video encoder may determine a first co-located picture for determining a first TMVP (122). In addition, video encoder 20 may determine a second co-located picture for determining a second TMVP (124). In some instances, as described above, the first co-located picture may be a temporal reference picture that is located in the same view or layer as the current block. The second co-located picture may be an inter-view or inter-layer reference picture that is located in a different view or layer as the current block.

Entropy encoding unit 56 may determine a list of candidate motion vector predictors including one or more temporal motion vector predictor (TMVPs) (126). For example, as noted above, entropy encoding unit 56 may include both TMVPs (associated with the first and second co-located pictures) in a candidate list. In other examples, entropy encoding unit 56 may select one of the TMVPs to include in the candidate list. In addition, entropy encoding unit 56 may perform a pruning process to remove one or more candidates from the candidate list.

After forming the list of candidate motion vector predictors, entropy encoding unit 56 selects one of the candidate motion vector predictors to use as a motion vector predictor for the current motion vector (128). Entropy encoding unit 56 then calculates the difference between the current motion vector and the selected (and potentially scaled) motion vector predictor (130).

Video encoder 20 may then calculate a residual block for the current block, e.g., to produce a transform unit (TU) (132). To calculate the residual block, video encoder 20 may calculate a difference between the original, uncoded block and the predicted block for the current block. Video encoder 20 may then transform and quantize coefficients of the residual block (134). Next, video encoder 20 may scan the quantized transform coefficients of the residual block (136). During the scan, or following the scan, video encoder 20 may entropy encode the coefficients and the motion vector difference (138). For example, video encoder 20 may encode the coefficients using CAVLC or CABAC. Video encoder 20 may then output the entropy coded data for coefficients and the motion vector difference of the block (140).

In this manner, the method of FIG. 9 represents an example of a method for encoding video data, the method including determining a first co-located reference picture for generating a first temporal motion vector predictor candidate for predicting a motion vector of a current block, determining a second co-located reference picture for generating a second temporal motion vector predictor candidate for predicting the motion vector of the current block, determining a motion vector predictor candidate list that includes at least one of the first temporal motion vector predictor candidate and the second temporal motion vector predictor candidate, selecting a motion vector predictor from the motion vector predictor candidate list, and encoding the motion vector of the current block relative to the selected motion vector predictor.

Figure 10:
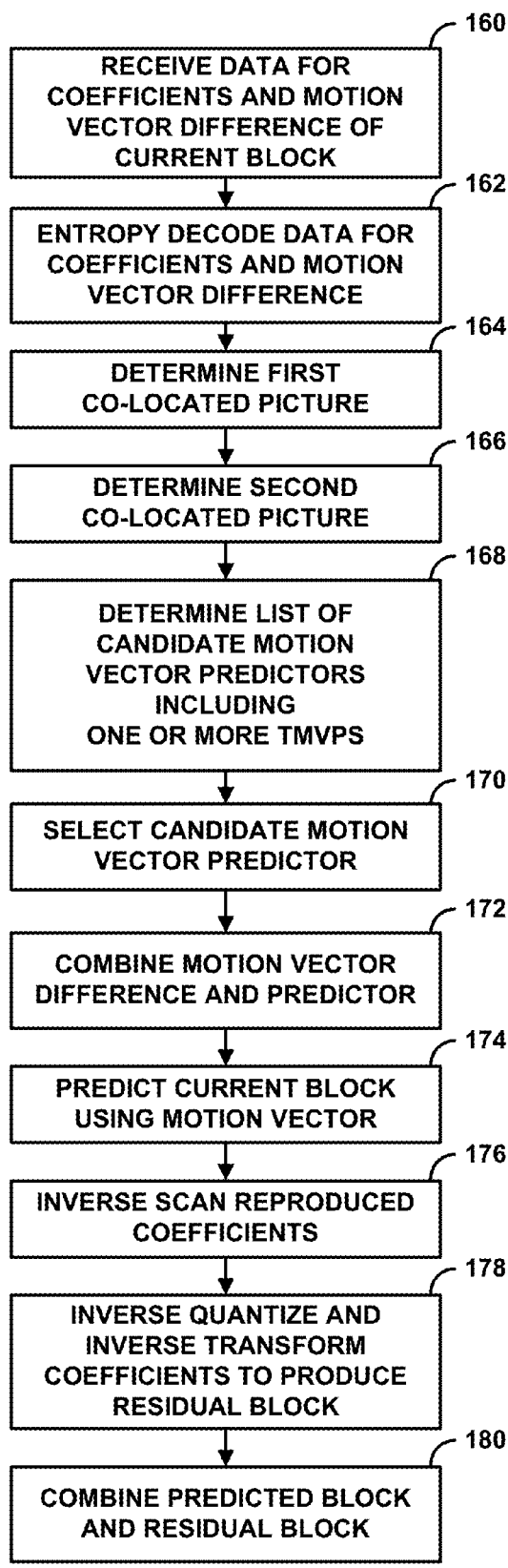
FIG. 10 is a flowchart illustrating an example method for decoding a current block of video data in accordance with the techniques of this disclosure.

FIG. 10 is a flowchart illustrating an example method for decoding a current block of video data in accordance with the techniques of this disclosure. The current block may comprise a current CU or a portion of the current CU (e.g., a PU). Although described with respect to video decoder 30 (FIGS. 1 and 3), it should be understood that other devices may be configured to perform a method similar to that of FIG. 10.

Initially, video decoder 30 receives data for transform coefficients and motion vector difference values of the current block (160). Entropy decoding unit 70 entropy decodes the data for the coefficients and the motion vector difference values (162).

Video decoder 30 may then decode the motion vector. According to aspects of this disclosure, video decoder 30 may determine more than one TMVP for predicting the motion vector. Accordingly, video decoder 30 may determine a first co-located picture for determining a first TMVP (164). In addition, video decoder 30 may determine a second co-located picture for determining a second TMVP (166). In some instances, as described above, the first co-located picture may be a temporal reference picture that is located in the same view or layer as the current block. The second co-located picture may be an inter-view or inter-layer reference picture that is located in a different view or layer as the current block.

Entropy decoding unit 70 may determine a list of candidate motion vector predictors including one or more temporal motion vector predictor (TMVPs) (168). For example, as noted above, entropy decoding unit 70 may include both TMVPs (associated with the first and second co-located pictures) in a candidate list. In other examples, entropy decoding unit 70 may select one of the TMVPs to include in the candidate list. In addition, entropy decoding unit 70 may perform a pruning process to remove one or more candidates from the candidate list.

Entropy decoding unit 70 then selects one of the candidate motion vector predictors as the motion vector predictor for the current motion vector (170). In some examples, entropy decoding unit 70 selects the motion vector predictor according to an implicit, predefined process, whereas in other examples, entropy decoding unit 70 decodes a syntax element indicative of which of the list of candidate motion vectors to select. Entropy decoding unit 70 then mathematically combines the decoded motion vector difference values with the motion vector predictor to reproduce the current motion vector (172). For example, entropy decoding unit 70 may add the x-component of the motion vector difference (MVDx) to the x-component of the selected motion vector predictor, and the y-component of the motion vector difference (MVDy) to the y-component of the selected motion vector predictor.

Video decoder 30 may predict the current block using the decoded motion vector (174). Video decoder 30 may then inverse scan the reproduced coefficients (176), to create a block of quantized transform coefficients. Video decoder 30 may then inverse quantize and inverse transform the coefficients to produce a residual block (178). Video decoder 30 may ultimately decode the current block by combining the predicted block and the residual block (180).

In this manner, the method of FIG. 10 represents an example of a method of decoding video data, the method including determining a first co-located reference picture for generating a first temporal motion vector predictor candidate for predicting a motion vector of a current block, determining a second co-located reference picture for generating a second temporal motion vector predictor candidate for predicting the motion vector of the current block, determining a motion vector predictor candidate list that includes at least one of the first temporal motion vector predictor candidate and the second temporal motion vector predictor candidate, selecting a motion vector predictor from the motion vector predictor candidate list, and decoding the motion vector of the current block relative to the selected motion vector predictor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Certain aspects of this disclosure have been described with respect to the developing HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, by one or more processors, a first co-located reference picture in a first layer for generating a first temporal motion vector predictor candidate for predicting a motion vector of a current block of a current picture of the first layer;
    determining, by the one or more processors, a second co-located reference picture in a second layer of video data that is different from the first layer for generating a second temporal motion vector predictor candidate for predicting the motion vector of the current block of the current picture of the first layer;
    determining, by the one or more processors, a motion vector predictor candidate list that includes at least one of the first temporal motion vector predictor candidate and the second temporal motion vector predictor candidate;
    selecting, by the one or more processors, a motion vector predictor from the motion vector predictor candidate list; and
    decoding, by the one or more processors, the motion vector of the current block relative to the selected motion vector predictor.

2. The method of claim 1, further comprising:
    determining, by the one or more processors, a priority for the first co-located reference picture and the second co-located reference picture, and
    wherein determining the motion vector candidate list comprises adding the first motion vector predictor candidate of the first co-located reference picture and the second motion vector predictor candidate of the second co-located reference picture at positions in the candidate list based on the priority.

3. The method of claim 2, wherein determining the priority comprises assigning a higher priority to a long-term reference picture.

4. The method of claim 1, further comprising:
    determining, by the one or more processors, a priority for the first co-located reference picture and the second co-located reference picture;
    selecting, by the one or more processors, between one of the first co-located reference picture and the second co-located reference picture based on the priority; and
    wherein determining the motion vector candidate list comprises adding the temporal motion vector predictor candidate of the selected co-located reference picture to the motion vector candidate list and excluding the temporal motion vector predictor candidate of the non-selected co-located reference picture from the motion vector candidate list.

5. The method of claim 1, further comprising:
    generating, by the one or more processors, the first temporal motion vector predictor candidate based on a location of a center of a first co-located block of the first co-located reference picture; and
    generating, by the one or more processors, the second temporal motion vector predictor candidate based on a location of a center of a second co-located block of the second co-located reference picture.

6. The method of claim 1, wherein the first co-located picture and the second co-located picture are included in one or more reference picture lists containing one or more other reference pictures, the method further comprising:
    determining, by the one or more processors, whether a reference picture in the one or more reference picture list comprises one of the first co-located picture and the second co-located picture; and
    performing, by the one or more processors, motion compression based on the determination, including performing motion compression on the one or more other reference pictures without performing motion compression on the first co-located picture and the second co-located picture.

7. The method of claim 1, further comprising:
  determining, by the one or more processors, the first temporal motion vector predictor candidate including determining a first motion vector associated with first one or more blocks in the first co-located reference picture using a temporal motion vector prediction process, wherein the one or more blocks have fixed relative coordinates; and
  determining, by the one or more processors, the second temporal motion vector predictor candidate including determining a second motion vector associated with second one or more blocks in the second co-located reference picture with the fixed relative coordinates and using the temporal motion vector prediction process.

8. The method of claim 7, wherein the temporal motion vector prediction process conforms to a High Efficiency Video Coding standard.

9. The method of claim 1,
  wherein determining the first co-located reference picture comprises identifying one of a short-term reference picture and a long-term reference picture in a reference picture list, and
  wherein determining the second co-located reference picture comprises identifying a short-term reference picture in the reference picture list when the first co-located reference picture is identified as a long-term reference picture and identifying a long-term reference picture reference picture list when the first co-located reference picture is identified as a short-term reference picture.

10. A method for encoding video data, the method comprising:
  determining, by one or more processors, a first co-located reference picture in a first layer for generating a first temporal motion vector predictor candidate for predicting a motion vector of a current block of a current picture of the first layer;
  determining, by the one or more processors, a second co-located reference picture in a second layer of video data that is different from the first layer for generating a second temporal motion vector predictor candidate for predicting the motion vector of the current block of the current picture of the first layer;
  determining, by the one or more processors, a motion vector predictor candidate list that includes at least one of the first temporal motion vector predictor candidate and the second temporal motion vector predictor candidate;
  selecting, by the one or more processors, a motion vector predictor from the motion vector predictor candidate list; and
  encoding, by the one or more processors, the motion vector of the current block relative to the selected motion vector predictor.

11. The method of claim 10, further comprising:
  determining, by the one or more processors, a priority for the first co-located reference picture and the second co-located reference picture, and
  wherein determining the motion vector candidate list comprises adding the first motion vector predictor candidate of the first co-located reference picture and the second motion vector predictor candidate of the second co-located reference picture at positions in the candidate list based on the priority.

12. The method of claim 11, wherein determining the priority comprises assigning a higher priority to a long-term reference picture.

13. The method of claim 10, further comprising:
  determining, by the one or more processors, a priority for the first co-located reference picture and the second co-located reference picture;
  selecting, by the one or more processors, between one of the first co-located reference picture and the second co-located reference picture based on the priority; and
  wherein determining the motion vector candidate list comprises adding the temporal motion vector predictor candidate of the selected co-located reference picture to the motion vector candidate list and excluding the temporal motion vector predictor candidate of the non-selected co-located reference picture from the motion vector candidate list.

14. The method of claim 10, further comprising:
  generating, by the one or more processors, the first temporal motion vector predictor candidate based on a location of a center of a first co-located block of the first co-located reference picture; and
  generating, by the one or more processors, the second temporal motion vector predictor candidate based on a location of a center of a second co-located block of the second co-located reference picture.

15. The method of claim 10, wherein the first co-located picture and the second co-located picture are included in one or more reference picture lists containing one or more other reference pictures, the method further comprising:
  determining, by the one or more processors, whether a reference picture in the one or more reference picture list comprises one of the first co-located picture and the second co-located picture; and
  performing, by the one or more processors, motion compression based on the determination, including performing motion compression on the one or more other reference pictures without performing motion compression on the first co-located picture and the second co-located picture.

16. The method of claim 10, further comprising:
  determining, by the one or more processors, the first temporal motion vector predictor candidate including determining a first motion vector associated with first one or more blocks in the first co-located reference picture using a temporal motion vector prediction process, wherein the one or more blocks have fixed relative coordinates; and
  determining, by the one or more processors, the second temporal motion vector predictor candidate including determining a second motion vector associated with second one or more blocks in the second co-located reference picture with the fixed relative coordinates and using the temporal motion vector prediction process.

17. The method of claim 16, wherein the temporal motion vector prediction process conforms to a High Efficiency Video Coding standard.

18. The method of claim 10,
  wherein determining the first co-located reference picture comprises identifying one of a short-term reference picture and a long-term reference picture in a reference picture list, and
  wherein determining the second co-located reference picture comprises identifying a short-term reference picture in the reference picture list when the first co-located reference picture is identified as a long-term reference picture and identifying a long-term reference picture reference picture list when the first co-located reference picture is identified as a short-term reference picture.

19. A device for coding video data, the device comprising:
a memory configured to store a current block; and
a video coder configured to:
   determine a first co-located reference picture in a first layer for generating a first temporal motion vector predictor candidate for predicting a motion vector of the current block of a current picture of the first layer;
   determine a second co-located reference picture in a second layer of video data that is different from the first layer for generating a second temporal motion vector predictor candidate for predicting the motion vector of the current block of the current picture of the first layer;
   determine a motion vector predictor candidate list that includes at least one of the first temporal motion vector predictor candidate and the second temporal motion vector predictor candidate;
   select a motion vector predictor from the motion vector predictor candidate list; and
   code the motion vector of the current block relative to the selected motion vector predictor.

20. The device of claim 19, wherein the video coder is further configured to:
   determine a priority for the first co-located reference picture and the second co-located reference picture, and
   wherein to determine the motion vector candidate list, the device is configured to add the first motion vector predictor candidate of the first co-located reference picture and the second motion vector predictor candidate of the second co-located reference picture at positions in the candidate list based on the priority.

21. The device of claim 19, wherein to determine the priority, the video coder is configured to assign a higher priority to a long-term reference picture.

22. The device of claim 19, wherein the video coder is further configured to:
   determine a priority for the first co-located reference picture and the second co-located reference picture;
   select between one of the first co-located reference picture and the second co-located reference picture based on the priority; and
   wherein to determine the motion vector candidate list, the device is configured to add the temporal motion vector predictor candidate of the selected co-located reference picture to the motion vector candidate list and exclude the temporal motion vector predictor candidate of the non-selected co-located reference picture from the motion vector candidate list.

23. The device of claim 19, wherein the first co-located picture and the second co-located picture are included in one or more reference picture lists containing one or more other reference pictures, the video coder further configured to:
   determine whether a reference picture in the one or more reference picture list comprises one of the first co-located picture and the second co-located picture; and
   perform motion compression based on the determination, including performing motion compression on the one or more other reference pictures without performing motion compression on the first co-located picture and the second co-located picture.

24. The device of claim 19, wherein the video coder is further configured to:
   determine the first temporal motion vector predictor candidate including determining a first motion vector associated with first one or more blocks in the first co-located reference picture using a temporal motion vector prediction process, wherein the one or more blocks have fixed relative coordinates; and
   determine the second temporal motion vector predictor candidate including determining a second motion vector associated with second one or more blocks in the second co-located reference picture with the fixed relative coordinates and using the temporal motion vector prediction process.

25. The device of claim 19,
   wherein to determine the first co-located reference picture, the video coder is configured to identify one of a short-term reference picture and a long-term reference picture in a reference picture list, and
   wherein to determine the second co-located reference picture, the video coder is configured to identify a short-term reference picture in the reference picture list when the first co-located reference picture is identified as a long-term reference picture and to identify a long-term reference picture reference picture list when the first co-located reference picture is identified as a short-term reference picture.

26. The device of claim 19, wherein to code the motion vector of the current block relative to the selected motion vector predictor, the video coder is configured to encode the motion vector of the current block relative to the selected motion vector predictor, including encoding data indicating one of a merge mode index identifying the selected motion vector predictor and a motion vector difference value comprising a difference between the motion vector of the current block and the selected motion vector predictor in an encoded bitstream.

27. The device of claim 19, wherein to code the motion vector of the current block relative to the selected motion vector predictor, the video coder is configured to decode the motion vector of the current block relative to the selected motion vector predictor, including obtaining, from an encoded bitstream, data indicating one of a merge mode index identifying the selected motion vector predictor and a motion vector difference value comprising a difference between the motion vector of the current block and the selected motion vector predictor.

28. A device for coding video data, the device comprising:
   means for determining a first co-located reference picture in a first layer for generating a first temporal motion vector predictor candidate for predicting a motion vector of a current block of a current picture of the first layer;
   means for determining a second co-located reference picture in a second layer of video data that is different from the first layer for generating a second temporal motion vector predictor candidate for predicting the motion vector of the current block of the current picture of the first layer;
   means for determining a motion vector predictor candidate list that includes at least one of the first temporal motion vector predictor candidate and the second temporal motion vector predictor candidate;
   means for selecting a motion vector predictor from the motion vector predictor candidate list; and
   means for coding the motion vector of the current block relative to the selected motion vector predictor.

29. The device of claim 28, further comprising:
   means for determining a priority for the first co-located reference picture and the second co-located reference picture, and
   wherein the means for determining the motion vector candidate list comprises means for adding the first motion vector predictor candidate of the first co-located reference picture and the second motion vector predictor candidate of the second co-located reference picture at positions in the candidate list based on the priority.

30. The device of claim 28,
wherein the means for determining the first co-located reference picture comprises means for identifying one of a short-term reference picture and a long-term reference picture in a reference picture list, and
wherein the means for determining the second co-located reference picture comprises means for identifying a short-term reference picture in the reference picture list when the first co-located reference picture is identified as a long-term reference picture and means for identifying a long-term reference picture reference picture list when the first co-located reference picture is identified as a short-term reference picture.

31. A non-transitory computer-readable storage medium having stored thereon instructions that, when executed, cause a processor of a device for coding video data to:
determine a first co-located reference picture in a first layer for generating a first temporal motion vector predictor candidate for predicting a motion vector of a current block of a current picture of the first layer;
determine a second co-located reference picture in a second layer of video data that is different from the first layer for generating a second temporal motion vector predictor candidate for predicting the motion vector of the current block of the current picture of the first layer;
determine a motion vector predictor candidate list that includes at least one of the first temporal motion vector predictor candidate and the second temporal motion vector predictor candidate;
select a motion vector predictor from the motion vector predictor candidate list; and
code the motion vector of the current block relative to the selected motion vector predictor.

32. The non-transitory computer-readable storage medium of claim 31, wherein the instructions further cause the processor to:
determine a priority for the first co-located reference picture and the second co-located reference picture, and
wherein to determine the motion vector candidate list, the instructions cause the processor to add the first motion vector predictor candidate of the first co-located reference picture and the second motion vector predictor candidate of the second co-located reference picture at positions in the candidate list based on the priority.

33. The non-transitory computer-readable storage medium of claim 31,
wherein to determine the first co-located reference picture, the instructions cause the processor to identify one of a short-term reference picture and a long-term reference picture in a reference picture list, and
wherein to determine the second co-located reference picture, the instructions cause the processor to identify a short-term reference picture in the reference picture list when the first co-located reference picture is identified as a long-term reference picture and identify a long-term reference picture reference picture list when the first co-located reference picture is identified as a short-term reference picture.

\* \* \* \* \*